US012718326B2

(12) United States Patent
Sugiyama et al.

(10) Patent No.: US 12,718,326 B2
(45) Date of Patent: Aug. 25, 2026

(54) MEDICAL IMAGE PROCESSING APPARATUS AND CONTROL METHOD THEREOF

(71) Applicant: Canon Kabushiki Kaisha, Tokyo (JP)

(72) Inventors: Shinya Sugiyama, Nasushiobara (JP); Ryota Osumi, Nasushiobara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/315,070

(22) Filed: May 10, 2023

(65) Prior Publication Data

US 2023/0377109 A1 Nov. 23, 2023

(30) Foreign Application Priority Data

May 20, 2022 (JP) ................................ 2022-083115

(51) Int. Cl.
*G06T 5/50* (2006.01)
*G06T 5/00* (2024.01)
(Continued)

(52) U.S. Cl.
CPC .................. *G06T 5/50* (2013.01); *G06T 5/70* (2024.01); *H04N 5/268* (2013.01); *G06T 2200/24* (2013.01); *G06T 2207/10132* (2013.01); *G06T 2207/20092* (2013.01); *G06T 2207/20192* (2013.01); *G06T 2207/30004* (2013.01)

(58) Field of Classification Search
CPC ......... G06T 5/50; G06T 5/70; G06T 2200/24; G06T 2207/10132; G06T 2207/20092; G06T 2207/20192; G06T 2207/30004; H04N 5/268
See application file for complete search history.

(56) References Cited

U.S. PATENT DOCUMENTS

2014/0328526 A1* 11/2014 Wahrenberg ......... A61B 8/0866 382/131
2016/0209995 A1* 7/2016 Jeon ........................ G16Z 99/00
(Continued)

FOREIGN PATENT DOCUMENTS

JP 2004-16612 A 1/2004
JP 2013-121449 6/2013
(Continued)

OTHER PUBLICATIONS

U.S. Appl. No. 18/155,272, filed Jan. 17, 2023; Osumi et al.
(Continued)

*Primary Examiner* — Stephen S Hong
*Assistant Examiner* — Darrin Hope
(74) *Attorney, Agent, or Firm* — Oblon, McClelland, Maier & Neustadt, L.L.P.

(57) ABSTRACT

The medical image processing apparatus disclosed herein includes processing circuitry configured to generate a first medical image by changing a value of an image quality parameter of a reference medical image with a first change strength predetermined for the image quality parameter, generate a second medical image by changing the value of the image quality parameter of the reference medical image with a second change strength greater than the first change strength; and switch and display the first medical image and the second medical images on a screen.

20 Claims, 19 Drawing Sheets

(51) Int. Cl.
*G06T 5/70* (2024.01)
*H04N 5/268* (2006.01)

(56) References Cited

U.S. PATENT DOCUMENTS

2021/0390696 A1* 12/2021 Iwase ........................ G06T 5/60
2023/0255601 A1 8/2023 Osumi et al.

FOREIGN PATENT DOCUMENTS

JP 2018-139919 A 9/2018
JP 2020-159789 A 10/2020
JP 2021-137259 A 9/2021
JP 2022-13535 A 1/2022
JP 2023-111610 A 8/2023

OTHER PUBLICATIONS

Japanese Office Action issued Nov. 18, 2025 in Japanese Patent Application No. 2022-083115, 5 pages.
Combined Chinese Office Action and Search Report Issued Feb. 4, 2026 in Chinese Patent Application No. 202310572921.4, 7 pages.
Office Action issued Mar. 17, 2026, in corresponding Japanese Patent Application No. 2022-083115, with English translation.

* cited by examiner

MEDICAL IMAGE PROCESSING APPARATUS AND CONTROL METHOD THEREOF

CROSS REFERENCE TO RELATED APPLICATIONS

This application is based upon and claims the benefit of priority from the prior Japanese Patent Application No. 2022-083115, filed on May 20, 2022, the entire contents of which are incorporated herein by reference.

FIELD

The embodiments disclosed in the specification and drawings relate to a medical image processing apparatus and a control method thereof.

BACKGROUND

Various medical image processing apparatus such as an ultrasonic diagnosis apparatus, a Magnetic Resonance Imaging (MRI) apparatus, an X-ray Computed Tomography (CT) apparatus, or a Positron Emission Tomography (PET) apparatus allows a user to adjust an image quality of a medical image based on the preferences of the user.

However, there are multiple image quality parameters that control the image quality, and for a user of the medical image processing apparatus to reach an optimal image quality by adjusting values of a plurality of image quality parameters, it is necessary to adjust the image quality while confirming a displayed image quality several times. Although there are various layouts of a screen for image quality adjustment, generally, the user determines the medical image of the optimal image quality while repeating image quality adjustment for a single medical image that is displayed, or repeating an operation of selecting a thumbnail that is close to a preference among a plurality of thumbnail images in which the values of the image quality parameter is different.

However, there are cases where changes in the displayed medical image or the thumbnail image is small, even if the image quality parameter of the medical image is changed with a change strength (change width) predetermined for the image quality parameter. If an effect on the image quality is small even if the value of the image quality parameter is changed, there is a concern that the user might not realize the change of the image quality parameter.

DETAILED DESCRIPTION

With reference to the drawings below, embodiments of a medical image processing apparatus will be described. In the description below, same reference signs are given for components substantially identical in terms of configuration and function, and duplicate description will be given only when necessary.

First Embodiment

Figure 1:
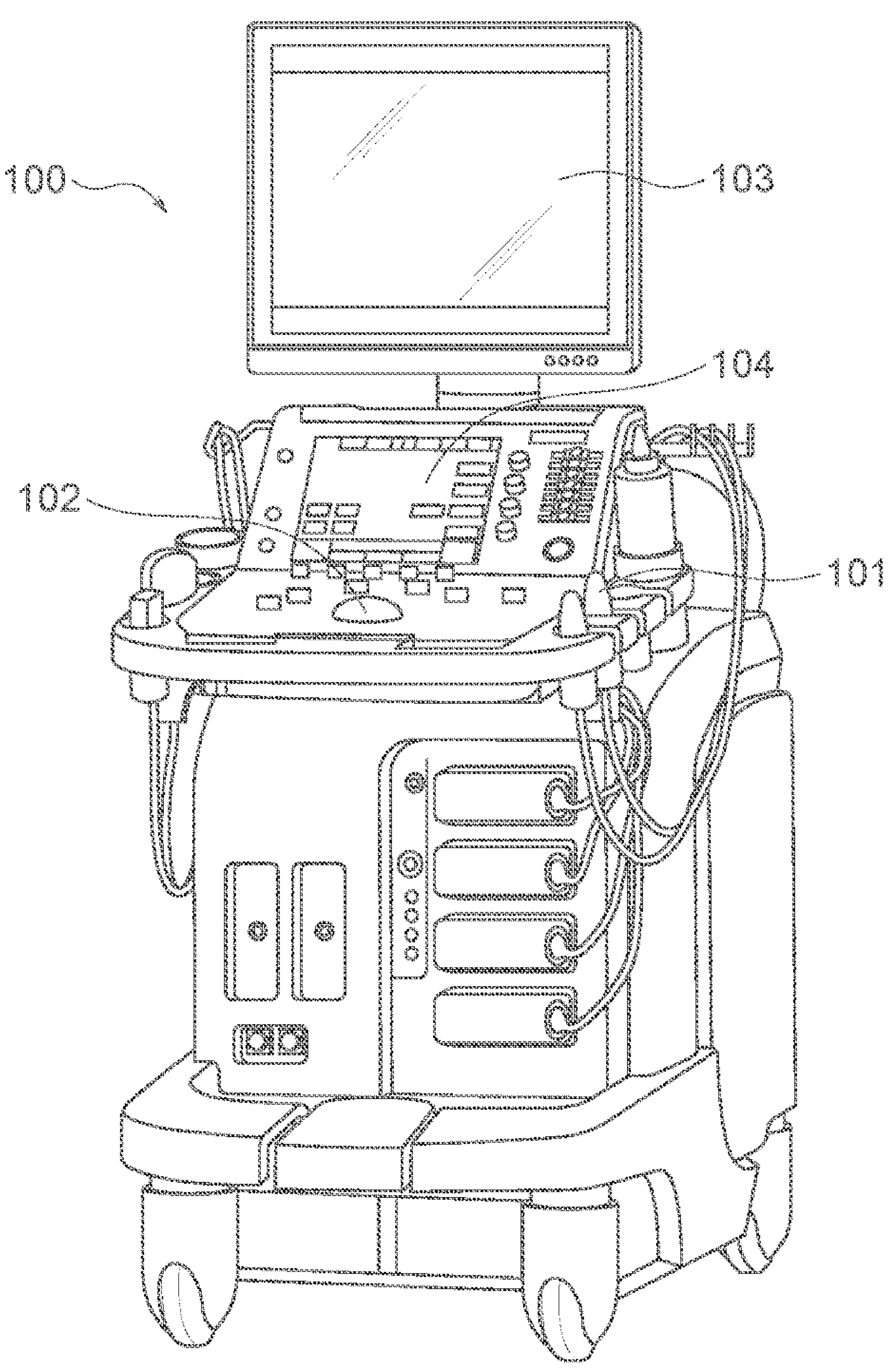
FIG. 1 is a perspective view illustrating a whole exemplary configuration of a medical image processing apparatus according to a first embodiment.
Figure 2:
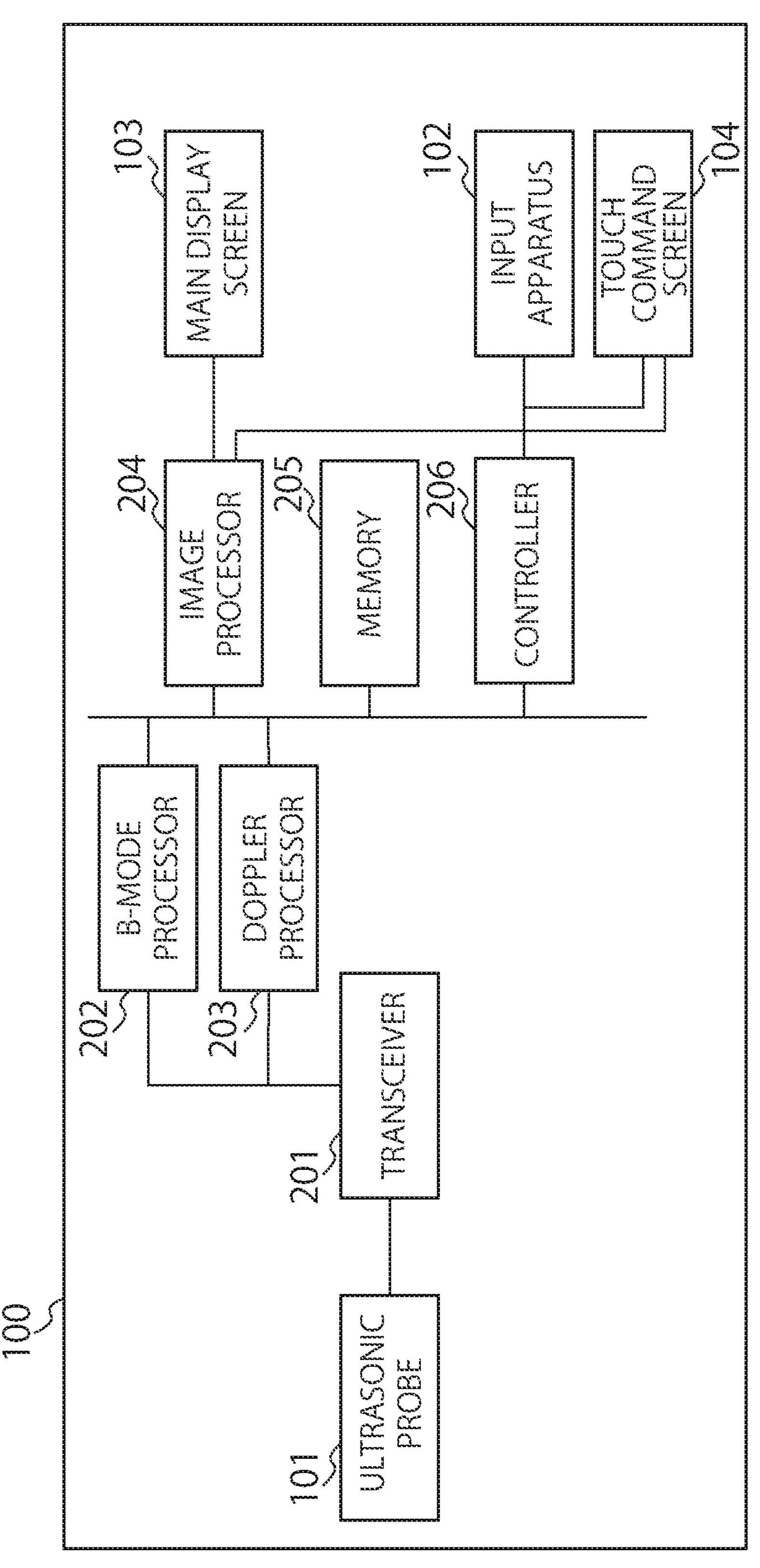
FIG. 2 is a diagram illustrating an exemplary block configuration diagram of the medical image processing apparatus shown in FIG. 1.

FIG. 1 is a perspective view illustrating a whole exemplary configuration of a medical image processing apparatus 100 according to a first embodiment. For example, the medical image processing apparatus 100 shown in FIG. 1 may be configured by an ultrasonic diagnosis apparatus. FIG. 2 illustrates an exemplary block configuration diagram of the medical image processing apparatus 100 shown in FIG. 1.

As shown in FIGS. 1 and 2, the medical image processing apparatus 100 according to the present embodiment has an ultrasonic probe 101, an input apparatus 102, a main display screen 103, and a touch command screen (TCS) 104. Likewise, as shown in FIG. 2, in addition to these, the medical image processing apparatus 100 has a transceiver 201, a B mode processor 202, a doppler processor 203, an image processor 204, a memory 205, and a controller 206 in its internal portion.

The ultrasonic probe 101 is a device (probe) which irradiates an ultrasonic signal to a subject and detects the ultrasonic signal reflected from the subject, which is formed of an electrically/mechanically reversible conversion element. For example, this ultrasonic probe 101 may be configured by a phased array type probe which equips a plurality of elements arranged in an array on its tip. By such, the ultrasonic probe 101 converts a supplied pulse drive voltage into the ultrasonic signal to transmit it to a desired direction within a scan region of the subject and converts the ultrasonic signal reflected from the subject into an echo signal of a corresponding voltage thereto.

The ultrasonic probe 101 may be an 1D array probe which scans the subject in 2-dimention or a 3-dimentional probe which scans the subject in 3-dimention, i.e., a mechanical 4D probe or a 2D array probe. When using the 3-dimentional probe, a specific tomographic image or a multi planar reconstruction (MPR) indication is included in a medical image displayed on the main display screen 103.

The transceiver 201 has a trigger generation circuit, a delay circuit, and a pulsar circuit etc., and supplies a drive signal to the ultrasonic probe 101. The pulsar circuit repeatedly generates a rate pulse to form the ultrasonic signal to be transmitted at a preset rate frequency. Likewise, the delay circuit applies a delay time for every piezoelectric oscillation, necessary to converge the ultrasonic signal generated from the ultrasonic probe 101 into a beam and determine a transmission directivity, to each rate pulse generated by the pulsar circuit. Also, the trigger generation circuit applies the drive signal (drive pulse) to the ultrasonic probe 101 at timings based on the rate pulse. That is, the delay circuit arbitrarily adjusts a transmission direction from a piezoelectric oscillator surface by changing the delay time applied to each rate pulse.

The transceiver 201 has a function that may instantaneously change a transmitting frequency or a transmitting drive voltage etc. to execute a preset scan sequence based on a command from the controller 206 which will be described below. Especially, a modification of a transmitting drive voltage is realized by a transmission circuit which may instantaneously switch the value or a mechanism which electrically switches a plurality of power source units.

The transceiver 201 also has an amplifier circuit, an A/D converter, an adder etc., and generates a reflected wave data by performing various processing to the ultrasonic signal, which is the reflected wave received by the ultrasonic probe 101. The amplifier circuit performs a gain correction processing by amplifying the ultrasonic signal, which is the reflected wave, for every channel. The A/D converter generates digital data by A/D converting the ultrasonic signal, which is the gain corrected reflected wave, and applies the delay time necessary to determine a receiving directivity to the digital data. The adder generates the reflected wave data by performing an adding process of the digital data generated by the A/D converter. A reflective component from a direction corresponding to the receiving directivity of the ultrasonic signal, which is the reflective wave, is enhanced by the adding process of the adder.

A method of transmitting/receiving by the transceiver 201 may be a method of transmitting/receiving a plane wave, instead of the method converging the ultrasonic signal into a beam as in the description above.

The B-mode processor 202 performs a logarithmic amplification, an envelope detection processing, a logarithmic compression etc., on the reflected wave data from the transceiver 201 and generates a B-mode information where each signal intensity of a plurality of sample points is expressed as a change of luminance.

The Doppler processor 203 performs a color Doppler method on the reflected wave data from the transceiver 201 and computes blood flow information, i.e., Doppler information. In the color Doppler method, transmitting/receiving of the ultrasonic signal is performed multiple times on a same scan line, suppressing a signal (clutter signal) originating from a stationary tissue or a slow-moving tissue by applying an MTI (Moving Target Indicator) filter to a data array in a same location, and a signal originating from a blood flow is extracted. Then, in the color Doppler method, the Doppler information such as a blood flow velocity, a blood flow dispersion, a blood flow power etc., is estimated from the blood flow signal.

The image processor 204 converts a scanning system of the B-mode information and the Doppler information into a scanning system suitable for display (scan conversion) and generates an ultrasonic diagnosis image as the medical image. Information indicating a composition, parallelism, and display position of each image information, furthermore various information to assist an operation of the medical image processing apparatus 100, which is the ultrasonic diagnosis apparatus, and an attendant information necessary for ultrasonic diagnosis of patient information etc. are generated together with the ultrasonic diagnosis image. Likewise, the image processor 204 generates a thumbnail image for the touch command screen 104, which will be described later, by reducing a size of the medical image after processing.

The image processor 204 has an enhancement image processing not shown. The enhancement image processing may perform reduction of an image noise or a speckle, enhancement of an edge of two tissue borders, or coherency enhancement which smooths images around the boundary along a boundary. In other words, the enhancement image processing may independently apply each image quality parameter of the noise reduction, edge enhancement, and coherency enhancement respectively. Adjustment methods of each image quality parameter will be described later. Likewise, the image processor 204 may also adjust the image quality of the medical image based on image quality parameters other than the noise reduction, edge enhancement, and coherency enhancement.

The main display screen 103, in conjunction with the image processor 204, displays the medical image on the screen by converting the image information from the image processor 204 into optical information.

The memory 205 stores each information disclosed in the description of the image processor 204 including the B-mode information or the Doppler information. Likewise, the memory 205 also appropriately stores information related to the trajectory as a result of adjusting each image quality parameter, a past trajectory, and an adjustable range of the image quality parameters which will be described later. The memory 205 configures the memory in the present embodiment.

Forms of storing in the memory 205 includes a case of temporarily storing a live information and a case of storing long-term for evidence of the live information acquired. Likewise, the memory 205 also stores a diagnosis information (for example, a patient ID, a doctor's opinion etc.) or various data such as a diagnosis protocol or various body marks, etc.

The controller 206 is a processor which realizes functions as an information processing apparatus and controls an overall process of the medical image processing apparatus 100 which is the ultrasonic diagnosis apparatus. Specifically, the controller 206 controls the processes of the transceiver 201, the B-mode processor 202, the Doppler processor 203, and the image processor 204 based on various setting requirements input by a user via the input apparatus 102, various control programs, and various data. Furthermore, the controller 206 also controls an interface function with the input apparatus 102 and the touch command screen 104.

The input apparatus 102 is connected to the controller 206 and has various switches, a button, a trackball, a mouse, and/or a keyboard etc., to introduce various commands from the user, setting commands for a reason of interest (ROI), various image quality condition setting commands etc., to the medical image processing apparatus 100.

The touch command screen 104 is an input/output device which has both functions as a user input device and as the output device to output information and image to the user. The touch command screen 104, other than outputting user input information to the controller 206, acquires images such as thumbnail images necessary for device input or graphics from the image processor 204. The touch command screen 104 configures the display in the present embodiment.

The touch command screen 104 may be used together with the trackball, the keyboard, a joystick, the mouse, or one or more similar user input devices known in the art. Likewise, the touch command screen 104 may be used together with other screens such as a non-touch command screen. Likewise, there may be two or more user input device and/or output device provided. For instance, the touch command screen 104 may be provided together with at least one input device such as the trackball, the keyboard, the joystick, or the mouse.

Likewise, by modifying the medical image processing apparatus 100 according to the present embodiment, the main display screen 103 and the touch command screen 104 may be on the same device. Furthermore, the main display screen 103, the touch command screen 104, and/or the input apparatus 102 may be on separate devices which may be connected to the medical image processing apparatus 100 by a wired or wireless channel.

Likewise, by modifying the medical image processing apparatus 100 according to the present embodiment, the B-mode processor 202, the Doppler processor 203, the image processor 204, the memory 205, and/or the controller 206 may be provided as one function of a server in a location separate from these elements.

Figure 3:
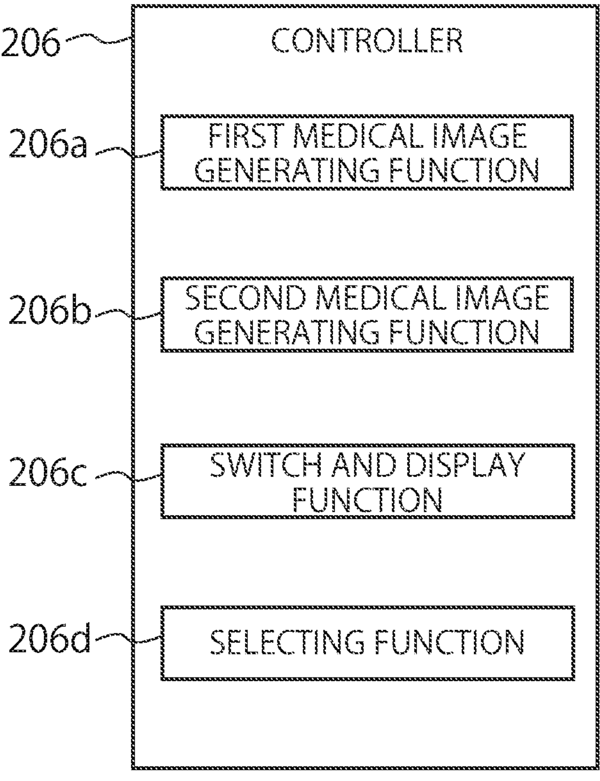
FIG. 3 is a functional block diagram describing functions of a controller of the medical image processing apparatus shown in FIG. 2.

FIG. 3 is a functional block diagram describing functions of the controller 206 of the medical image processing apparatus 100 according to the present embodiment. FIG. 3 exemplifies a specific functional block which the medical image processing apparatus 100 according to the present embodiment has, while omitting a functional block related to a general control of the medical image processing apparatus 100. As shown in FIG. 3, in the present embodiment, the controller 206 has a first image generating function 206*a*, a second image generating function 206*b*, a switch and display function 206*c*, and a selecting function 206*d*.

In the present embodiment, each processing function executed in the first image generating function 206*a*, the second image generating function 206*b*, the switch and display function 206*c*, and the selecting function 206*d* is stored in the memory 205 in a form of a computer executable program. The controller 206 realizes functions corresponding to each program by reading the program from the memory 205 and executing it. In other words, the controller 206 that has read each program will have each function shown in the controller 206 of FIG. 3. Although it is described in FIG. 3 that the first image generating function 206*a*, the second image generating function 206*b*, the switch and display function 206*c*, and the selecting function 206*d* are realized in a single controller 206, these functions may be realized by combining a plurality of independent processors to configure the controller 206 and executing the program with each processor. Likewise, when the first image generating function 206*a*, the second image generating function 206*b*, the switch and display function 206*c*, and the selecting function 206*d* realizes each function, the image processor 204, the memory 205, the input apparatus 102, the main display screen 103, and the touch command screen 104 are appropriately controlled and used.

[Image Quality Adjustment Setting Screen]

Next, an image quality adjustment selection screen W10 for the user to adjust the image quality of the medical image displayed on the medical image processing apparatus 100 according to the present embodiment will be described.

Figure 4:
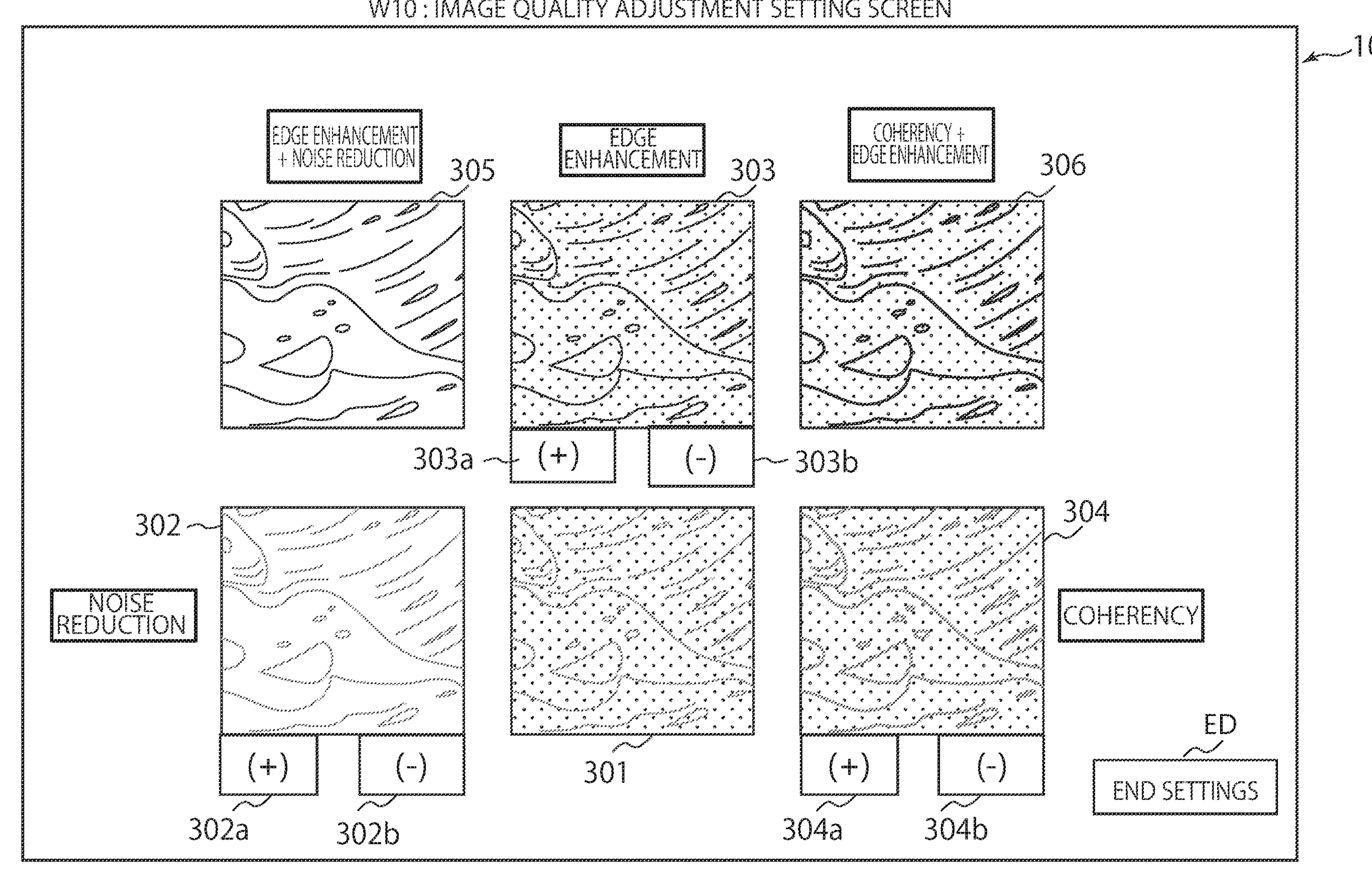
FIG. 4 is a diagram illustrating an exemplary image quality adjustment setting screen displayed on the medical image processing apparatus shown in FIG. 1.

FIG. 4 is a diagram illustrating an exemplary image quality adjustment setting screen W10 displayed on the touch command screen 104 of the medical image processing apparatus 100 according to the present embodiment. That is, in the medical image processing apparatus 100 according to the present embodiment, although an image quality adjustment process is performed in the image processor 204 under a control of the processing circuitry 206, the image quality adjustment setting screen W10 is used as a graphical user interface to adjust the image quality. The selecting function 206*d* in the controller 206 determines which part of the image quality adjustment selection screen W10 displayed on the touch command screen 104 the user has touched, and the user's selection is input to the medical image processing apparatus 100.

In the example of FIG. 4, the user may use the image quality adjustment setting screen W10 to perform image quality adjustments by changing values of three types of image quality parameters, i.e., noise reduction, edge enhancement, and coherency enhancement. Image quality parameters for displaying the medical image are not limited to these three types, but various image quality parameters may be adjusted. FIG. 4 illustrates a state in which the user has selected three types of image quality parameters that are noise reduction, edge enhancement, and coherency enhancement, among a plurality of image quality parameters to set the adjustable range.

In the image quality adjustment selection screen W10 shown in FIG. 4, a first to a sixth image quality adjustment buttons 301-306 are buttons rendered on the touch command screen 104. In the present embodiment, the first to sixth image quality adjustment buttons 301-306 are configured by the thumbnail images of the medical images. In the thumbnail images, output images of a different plurality of image qualities based on a same medical image data are rendered.

On the first image quality adjustment button 301 among the first to sixth image quality adjustment buttons 301-306 displayed on the touch command screen 104, it displays the thumbnail image, which is applied with the same image processing as that of the medical image displayed at that time on the main display screen 103. This thumbnail image is applied with the image processing with the image quality parameters of a reference medical image and becomes the first image quality adjustment button 301. Likewise, in the medical image where the first image quality adjustment button 301 becomes the center of a current image quality adjustment, a group of values of the image quality parameters to acquire this image quality from the medical image is referred to as an "anchor" in the present embodiment.

In the example of FIG. 4, since three types of image quality parameters as to the noise reduction, the edge enhancement, and the coherency enhancement are selected as the image quality parameters to adjust, one of values of the noise reduction, one of values of the edge enhancement, and one of values of the coherency enhancement is selected as the anchor. For this reason, the "anchor" may be comprehended as a point determined from values of these image quality parameters. As such, the thumbnail image of the first image quality adjustment button 301 is generated based on the anchor which are the values of the image quality index parameter selected by the user.

By operating the image quality adjustment setting screen W10, the user may increase or decrease each of the image quality parameters of the noise reduction, the edge enhancement, and the coherency enhancement with a preset value from the anchor. That is, a change strength is predetermined for each of the image quality parameter. The user may change the image quality parameter with the change strength predetermined for each of the image quality parameters. The change strength is equivalent to a first change strength (first change width) according to the present embodiment. The first change strength differs per types of the image quality parameters. That is, in the present embodiment, the first change strength is predetermined based on the type of each of the image quality parameters, and for instance, those may be stored and held in the memory 205.

The buttons for the operation of changing the values of the image quality parameters are the second to sixth image quality adjustment buttons 302-306. Specifically, the second image quality adjustment button 302 located left of the first image quality adjustment button 301 is a button which the user selects to increase or decrease the value of the image quality parameter of the noise reduction without changing other values of image quality parameter. Whether to increase or decrease the value of the image quality parameter of the noise reduction is switched by the switching buttons 302*a*, 302*b*.

For instance, when the user presses the second image quality adjustment button 302 to select after pressing the plus switching button 302*a*, the value of the image quality parameter of the noise reduction regarding the anchor increases by the first change strength, and this increased value becomes a next anchor. On the contrary, when the user presses the second image quality adjustment button 302 to select after pressing the minus switching button 302*b*, the value of the image quality parameter of the noise reduction regarding the anchor decreases by the first change strength, and this decreased value becomes the next anchor.

Also, the thumbnail image where the value of the image quality parameter of the noise reduction is increased or decreased by just the first change strength is displayed on the second image quality adjustment button 302. That is, when the user presses the plus switching button 302*a*, the thumbnail image of the second image quality adjustment button 302 switches to the thumbnail image where the value of the image quality parameter of the noise reduction level has increased by just the first change strength. On the other hand, when the user presses the minus switching button 302*b*, the thumbnail image of the second image quality adjustment button 302 switches to an image where the value of the image quality parameter of the noise reduction has decreased by just the first change strength. For this reason, the user may presume in advance a result of changing the value of the image quality parameter of the reference medical image with the first change strength by looking at the thumbnail image displayed on the second image quality adjustment button 302. And, by such, a more appropriate adjustment of the value of the image quality parameter may be performed. The thumbnail image displayed on the second image quality adjustment button 302 is equivalent to the first medical image according to the present embodiment.

However, there are cases where the reference medical image displayed on the first image quality adjustment button 301 and the medical image displayed on the second image quality adjustment button 302 are merely different. In such case, the user may be unable to precisely recognize the effect on the medical image by changing the value of the image quality parameter. Thus, in the medical image processing apparatus 100 according to the present embodiment, an image quality adjustment screen display process described below is performed when displaying the thumbnail image of the second image quality adjustment button 302.

In the same manner as the second image quality adjustment button 302, the third image quality adjustment button 303 located above the first image quality adjustment button 301 is a button which the user selects to increase or decrease the value of the image quality parameter of the edge enhancement with the first change strength without changing other values of the image quality parameters. Whether to increase or decrease the value of the image quality parameter of the edge enhancement is switched by the switching buttons 303*a*, 303*b*. The fourth image quality adjustment button 304 located right of the first image quality adjustment button 301 is a button which the user selects to increase or decrease the value of the image quality parameter of the coherency enhancement with the first change strength without changing other values of the image quality parameters. Whether to increase or decrease the value of the image quality parameter of the coherency enhancement is switched by the switching buttons 304*a*, 304*b*.

The fifth image quality adjustment button 305 is located above the second image quality adjustment button 302 and left of the third image quality adjustment button 303. This arrangement means that both values of the image quality parameters of the noise reduction and the edge enhancement may be changed with the first change strength. The sixth image quality adjustment button 306 is located right of the third image quality adjustment button 303 and above the fourth image quality adjustment button 304. This arrangement means that both values of the image quality parameters of the edge enhancement and the coherency enhancement may be changed with the first change strength.

By selecting the fifth image quality adjustment button 305, whether to increase or decrease the value of the image quality parameter of the noise reduction is switched by the switching buttons 302*a*, 302*b*, and whether to increase or decrease the value of the image quality parameter of the edge enhancement is switched by the switching buttons 303*a*, 303*b*. That is, increasing and decreasing the values of the image quality parameters of the noise reduction and the edge enhancement are switched by a combination of the switching buttons 302*a*, 302*b* and the switching buttons 303*a*, 303*b*.

Similarly, by selecting the sixth image quality adjustment button 306, whether to increase or decrease the value of the image quality parameter of the edge enhancement is switched by the switching buttons 303*a*, 303*b*, and whether to increase or decrease the value of the image quality parameter of the coherency enhancement is switched by the switching buttons 304*a*, 304*b*. That is, increasing and decreasing the values of the image quality parameters of the edge enhancement and the coherency enhancement when selecting the sixth image quality adjustment button 306 are switched by a combination of the switching buttons 303*a*, 303*b* and the switching buttons 304*a*, 304*b*.

The thumbnail images displayed on the third to sixth image quality adjustment buttons 303-306 are thumbnail images generated based on each of the values of the image quality parameters, and the user may presume in advance the result of the change of the values of the image quality parameters by looking at these thumbnail images. And, by such, more appropriate adjustment of the values of the image quality parameters may be performed. Thus, the thumbnail images displayed on the third to sixth image quality adjustment buttons 303-306 are also equivalent to the first medical image according to the present embodiment.

In the same manner as the second image quality adjustment button 302, there also may be cases where the reference medical image displayed on the first image quality adjustment button 301 and the medical images displayed on each of the third to sixth image quality adjustment buttons 303-306 are merely different. In such case, the user may be unable to precisely recognize the effect on the medical image by changing the value of the image quality parameter. Accordingly, in the medical image processing apparatus 100 according to the present embodiment, the image quality adjustment screen display process described below is performed when displaying the thumbnail images of the third to sixth image quality adjustment buttons 303-306.

When any of the second to sixth image quality adjustment buttons 302-306 is selected by the user, the values of the image quality parameters corresponding to a selected image quality adjustment button is set as a new reference anchor, the thumbnail image based on the values of the image quality parameters of the selected image quality adjustment button is displayed on the first image quality adjustment button 301, image processing using the values of the image quality parameters corresponding to the selected image quality adjustment button is executed by the image processor 204, and the result is displayed on the main display screen 103 as the medical image. That is, the new anchor becomes a group of values of the image quality parameters of the reference medical image. Likewise, new thumbnail images of the second to sixth image quality adjustment buttons 302-306 are generated based on the values of the image quality parameters of the new reference anchor and displayed to each.

For instance, when the user presses the second image quality adjustment button 302 to select, the values of the image quality parameter corresponding to the second image quality adjustment button 302 becomes the values of the image quality parameters of the new reference anchor. As a result, the thumbnail image of the second image quality adjustment button 302 becomes the thumbnail image of the first image quality adjustment button 301 and becomes the reference medical image. Likewise, the thumbnail images of the second to sixth image quality adjustment buttons 302-306 are generated and displayed with the values of the image quality parameters of the new first image quality adjustment button 301 as the anchor.

The medical image with the image quality desirable to the user is finally acquired by the user repeating such operations on the image quality adjustment selection screen W10. The user presses to select the end setting button ED to terminate the selection of the values of the image quality parameters when the values of the image quality parameters desirable to the user is reached. By such, the user terminates the process of adjusting the values of the image quality parameters of the medical image.

[Image Quality Adjustment Screen Display Process]

Next, the image quality adjustment screen display process executed in the medical image processing apparatus 100 according to the present embodiment will be described.

Figure 5:
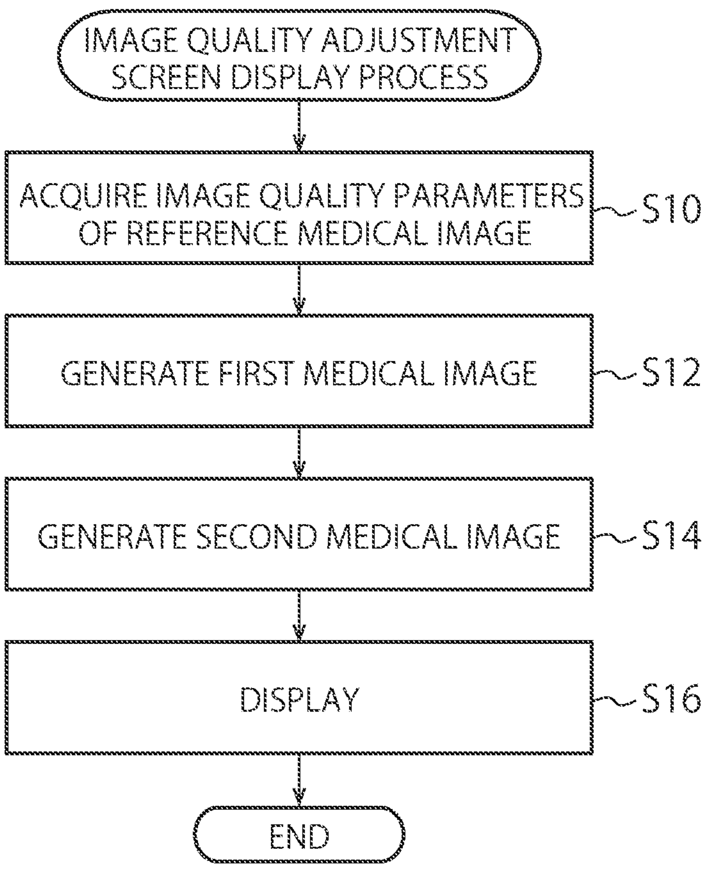
FIG. 5 is a diagram that illustrates a flowchart describing contents of the image quality adjustment screen display process executed by the medical image processing apparatus shown in FIG. 1.

FIG. 5 is a diagram that illustrates a flowchart describing contents of the image quality adjustment screen display process executed by the medical image processing apparatus 100 according to the present embodiment. The image quality adjustment screen display process shown in FIG. 5, for instance, may be a process realized by the controller 206 reading and executing an image quality adjustment screen display process program stored in the memory 205. The image quality adjustment screen display process may also be a process executed to display each of the thumbnail images of the second to sixth image quality adjustment buttons 302-306 as the medical image.

In the image quality adjustment screen display process according to the present embodiment as shown in FIG. 5, the medical image processing apparatus 100 first acquires the values of the image quality parameters of the reference medical image (Step S10). Specifically, a first medical image generating function 206*a* and a second medical image generating function 206*b* in the controller 206 of the medical image processing apparatus 100 acquires the values of the image quality parameters of the reference medical image. That is, the first medical image generating function 206*a* and the second medical image generating function 206*b* of the controller 206 acquires the values of the image quality parameters of the medical image displayed on the first image quality adjustment button 301 of the image quality adjustment selection screen W10. The values of the image quality parameters are the values of the image quality parameters of the anchor displayed above, and may be stored in the memory 205 or held by the controller 206.

Next, the medical image processing apparatus 100 generates the first medical image by changing the value of the image quality parameter of the reference medical image acquired at Step S10 with the first change strength predetermined for the image quality parameter (Step S12). Specifically, the first medical image generating function 206*a* in the controller 206 of the medical image processing apparatus 100 generates the first medical image by changing the value of the image quality parameter of the reference medical image with the first change strength.

Next, the medical image processing apparatus 100 generates the second medical image by changing the value of the image quality parameter of the reference medical image with the second change strength greater than the first change strength (Step S14). Specifically, the second medical image generating function 206*b* in the controller 206 of the medical image processing apparatus 100 generates the second medical image by changing the value of the image quality parameter of the reference image with the second change strength (second change width) greater than the first change strength.

Next, the medical image processing apparatus 100 switches and displays the first medical image generated by the first medical image generating function 206*a* at Step S12 and the second medical image generated by the second medical image generating function 206*b* at Step S14 (Step S16). Specifically, the switch and display function 206*c* in the controller 206 of the medical image processing apparatus 100 appropriately switches and displays these first medical image and the second medical image. By such, the image quality adjustment screen display process according to the present embodiment is terminated.

[Changing a Single Image Quality Parameter]

Figure 6:
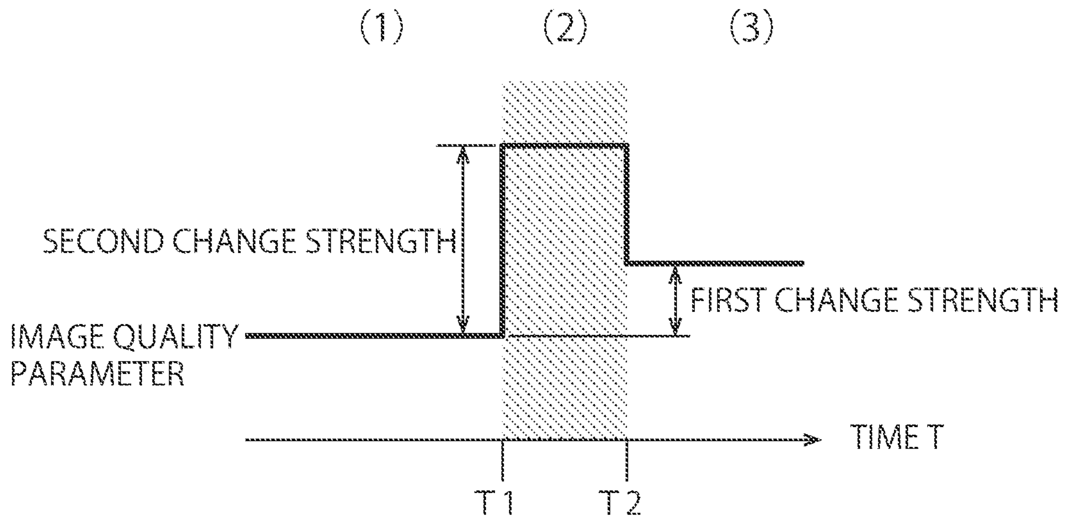
FIG. 6 is a diagram illustrating an exemplary chronological change of an image quality parameter of the medical image displayed by the image quality adjustment screen display process shown in FIG. 5.

FIG. 6 is a diagram illustrating a change of the image quality parameter of the medical image displayed by the image quality adjustment screen display process. In FIG. 6, a horizontal axis represents time T, and a vertical axis represents the value of the image quality parameter that is changed. In the present embodiment, the image quality parameter may be one of the parameters, for example, a noise reduction filter, an edge enhancement filter, or a coherency enhancement filter. In FIG. 6, the change of one image quality parameter among these image quality parameters is represented.

As shown in FIG. 6, in a phase (1) until reaching time T, the first medical image generating function 206*a* and the second medical image generating function 206*b* in the controller 206 acquires the value of the image quality parameter of the reference medical image. Then, the first medical image generating function 206*a* in the controller 206 generates the first medical image of which the value of the image quality parameter is changed with the first change strength, and the second medical image generating function 206*b* in the controller 206 generates the second medical image of which the value of the image quality parameter is changed with the second change strength greater than the first change strength. In the phase (1), the switch and display function 206*c* in the controller 206 selects and displays the reference medical image.

Then, the switch and display function 206*c* displays the second medical image generated by the second medical image generating function 206*b* between time T1 and time T2. This is a phase (2). After time T2, the switch and display function 206*c* in the controller 206 displays the first medical image. After time T2 is a phase (3). In the phase (3), the switch and display function 206*c* displays the first medical image generated by the first medical image generating function 206*a* after time T2. That is, in the present embodiment, the change of the medical image from the value of a reference image quality parameter to the changed value of the image quality parameter is represented as a combination of the first and second medical images.

As such, by displaying the second medical image changed with the second change strength greater than the first change strength before displaying the first medical image changed with the first change strength, it becomes possible to allow the user more clearly recognize slight changes of the image quality arising from changing the value of the image quality parameter. That is, since the first medical image is displayed after displaying the second medical image where the modification of the image quality parameter is enhanced, it becomes easier to understand how the changed image quality parameters affect the image quality, allowing the user to notice the change easily.

Figures 7A, 7B, 7C:
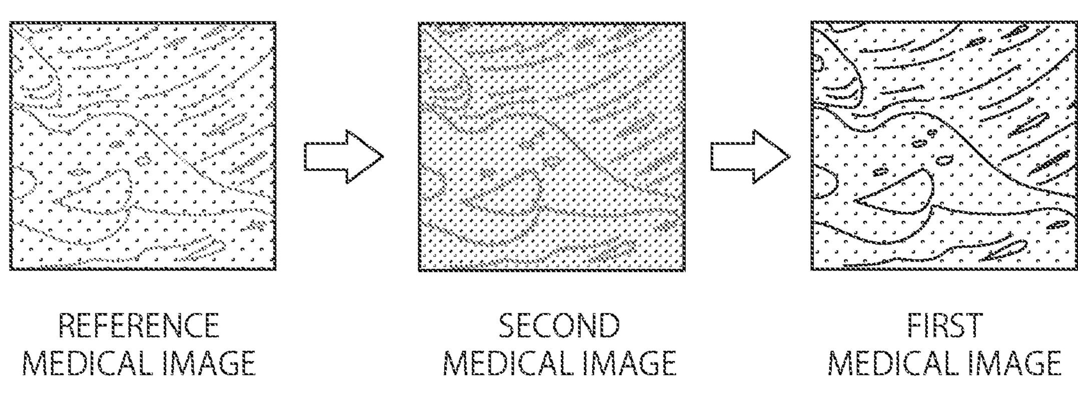
FIG. 7A through FIG. 7C are diagrams representing a change of the medical image where a value of edge enhancement filter is changed as the image quality parameter by the image quality adjustment screen display process shown in FIG. 5.

FIG. 7A through FIG. 7C are diagrams that represent a change of the medical image where the edge enhancement is changed as the image quality parameter by the image quality adjustment screen display process, which represents the chronological change of the thumbnail image displayed on the third image quality adjustment button 303 of FIG. 4. That is, the thumbnail image displayed as the third image quality adjustment button 303 of FIG. 4 chronologically changes in order of FIG. 7A, FIG. 7B, and FIG. 7C.

More specifically, FIG. 7A shows the reference medical image and the medical image displayed in the phase (1) of FIG. 6. The medical image of FIG. 7A is equivalent to the thumbnail image displayed on the first image quality adjustment button 301 of FIG. 4, i.e., the anchor. FIG. 7B shows the second medial image displayed in the phase (2) of FIG. 6, and FIG. 7C displays the first medical image displayed in the phase (3) of FIG. 6. As may be known from such, the thumbnail image of the third image quality adjustment button 303 chronologically changes in order of the reference medical image, the second medical image, and the first medical image.

In the changing pattern of the image quality parameter shown in FIG. 6, the thumbnail image of the third image quality adjustment button 303 first displays the reference image, switches to the second medical image at time T1, and then switches to the first medical image at time T2, but the timings when the thumbnail image chronologically changes is arbitrary. That is, at which timing the changing pattern of the image quality parameter shown in FIG. 6 starts may be arbitrarily set.

For instance, suppose that the user presses one of the second to sixth image quality adjustment buttons 302-306 at some timing, and the anchor, i.e., the value of the image quality parameter of the reference medical image was changed. Then, at this time, the switch and display function 206*c* of the controller 206 switches the thumbnail images of the third image quality adjustment button 303 and the first image quality adjustment button 301 to the medical image that uses the value of the image quality parameter of the new reference medical image.

Then, for instance five seconds later, at time T1, the switch and display function 206*c* of the controller 206 switches the thumbnail image of the third image quality adjustment button 303 to the second medical image generated by the second medical image generating function 206*b*. Subsequently, at time T2, for instance three seconds after time T1, the switch and display function 206*c* of the controller 206 switches the thumbnail image of the third image quality adjustment button 303 to the first medical image generated by the first medical image generating function 206*a*.

As may be known from such, timings when the first medical image generating function 206*a* generates the first medical image and when the second medical image generating function 206*b* generates the second medical image are arbitrary, and either one may be generated first or both may be simultaneously generated. In other words, it is sufficient for the second medical image generating function 206*b* to generate the second medical image at an arbitrary timing until the switch and display function 206*c* displays the second medical image at time T1, and for the first medical image generating function 206*a* to generate the first medical image at an arbitrary timing until the switch and display function 206*c* displays the first medical image at time T2.

Although in FIG. 7A through FIG. 7C the chronological change in order of the reference medical image, the second medical image, and the first medical image was described with an example where the image quality parameter is the edge enhancement filter, but image quality parameters other than edge enhancement also chronologically changes as shown in FIG. 6. In the example of the image quality adjustment selection screen W10 in FIG. 4, in the thumbnail image displayed as the second image quality adjustment button 302, the parameter of the noise reduction filter changes as shown in FIG. 6, and in the thumbnail image displayed as the fourth image quality adjustment button 304, the parameter of the coherency filter changes as shown in FIG. 6.

The changing pattern of the image quality parameter of FIG. 6 represents the chronological change where the user increases the value of the image quality parameter, but the changing pattern of FIG. 6 is turned upside down if the user selects to decrease the value of the image quality parameter. That is, if the user operates the switch button 302*a*, 302*b*, 303*a*, 303*b*, 304*a*, 304*b* in the image quality adjustment selection screen W10 of FIG. 4 and selects to decrease the value of the image quality parameter, the chronological change of the image quality parameter becomes a change as shown in FIG. 8.

Figure 8:
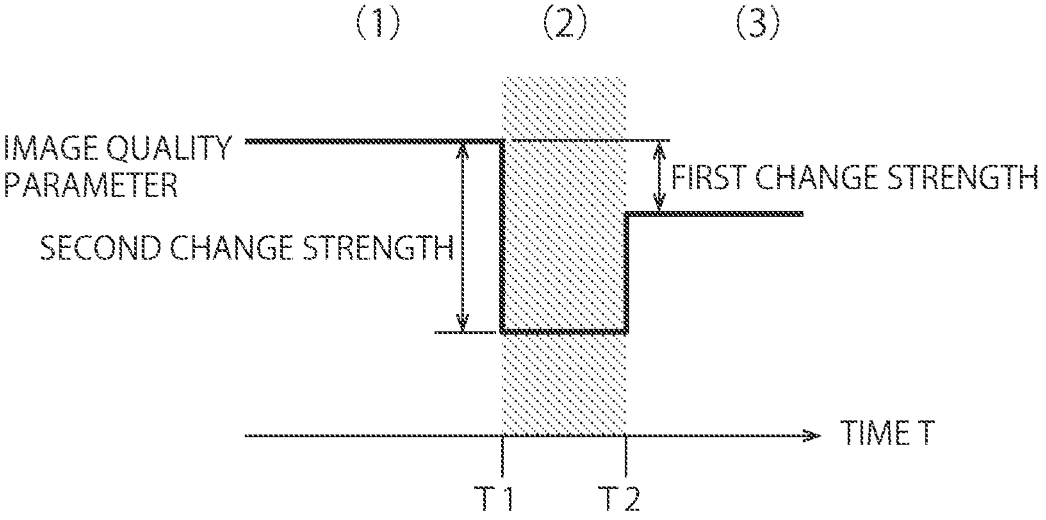
FIG. 8 is a diagram illustrating an exemplary chronological change of the image quality parameter where the image quality parameter is decreased, opposite to the chronological change of the image quality parameter shown in FIG. 6.

In such case, as shown in FIG. 8, the first medical image generating function 206*a* generates the first medical image by decreasing the value of the image quality parameter with the first change strength, and the second medical image generating function 206*b* generates the second medical image by decreasing the value of the image quality parameter with the second change strength. In other words, the second medical image generating function 206*b* generates the second medical image by changing the value of the image quality parameter of the reference medical image in a direction equal to the modification direction of the first change strength with the second change strength greater than the first change strength. For this reason, even when the user selects to decrease the value of the image quality parameter, the value of the image quality parameter may be changed with the second change strength greater than the first change strength, allowing the user to easily recognize the effect on the image quality by changing the image quality parameter.

Figure 9:
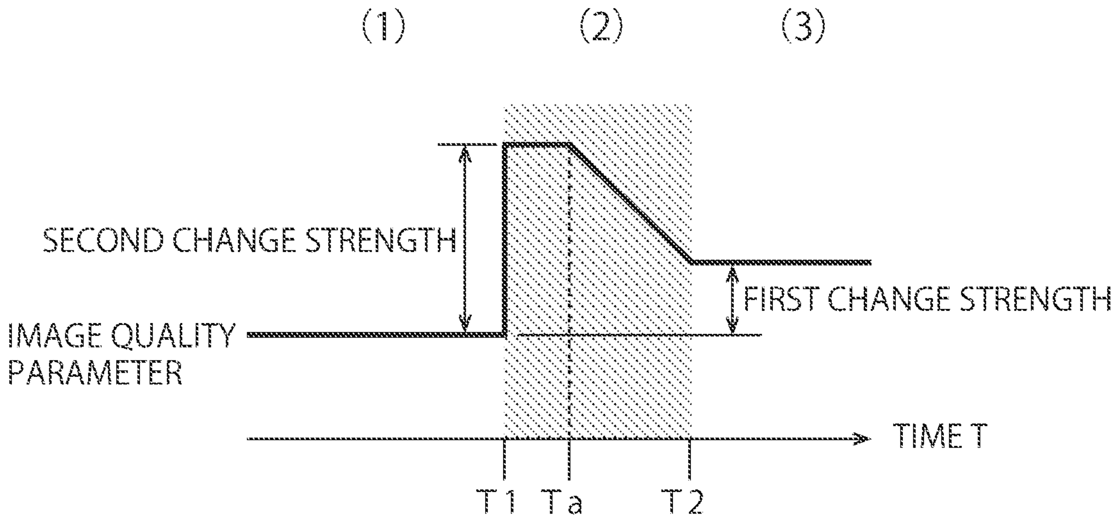
FIG. 9 is a diagram illustrating another different exemplary chronological change of the image quality parameter of the medical image, displayed by the image quality adjustment screen display process shown in FIG. 5.

FIG. 9 is a diagram illustrating a different exemplary chronological change of the image quality parameter of the medical image, displayed by the medical image processing apparatus 100 according to the present embodiment. In the example shown in FIG. 9, the second medical image generating function 206*b* in the controller 206 generates the second medical image by changing the value of the image quality parameter of the reference medical image in the direction equal to the modification direction of the first change strength with the second change strength greater than the first change strength at time T1. Further, the second medical image generating function 206*b* in the controller 206 generates the second medical image as a moving image by gradually changing the value of the image quality parameter of the second medical image from time Ta to time T2, towards the image quality parameter of the first medical image. Then, at time T2, the value of the image quality parameter of the second medical image generated by the second medical image generating function 206*b* in the controller 206 becomes a value equal to the image quality parameter of the first medical image.

The switch and display function 206*c* in the controller displays the second medical image generated by the second medical image generating function 206*b* from time T1 to time T2 and displays the first medical image generated by the first medical image generating function 206*a* after time T2. Thus, the second medical image displayed on the image quality adjustment selection screen W10 as the thumbnail image is a still image from time T1 to time Ta but becomes the moving image from time Ta to time T2. In other words, the chronological change of the image quality parameter of FIG. 6 is the still image, but the chronological change of the image quality parameter of FIG. 9 becomes a combination of the still image and the moving image.

Even if the value of the image quality parameter is changed as shown in FIG. 9, the second medical image generating function 206*b* may change the value of the image quality parameter of the second medical image with the second change strength greater than the first change strength, allowing the user to easily recognize slight changes in the image quality. In addition, since the value of the image quality parameter of the second medical image gradually approaches the value of the image quality parameter of the first medical image from time Ta to time T2, the user may easily understand more intuitively to what extent the change of the value of the image quality parameter affects the image quality.

Figure 10:
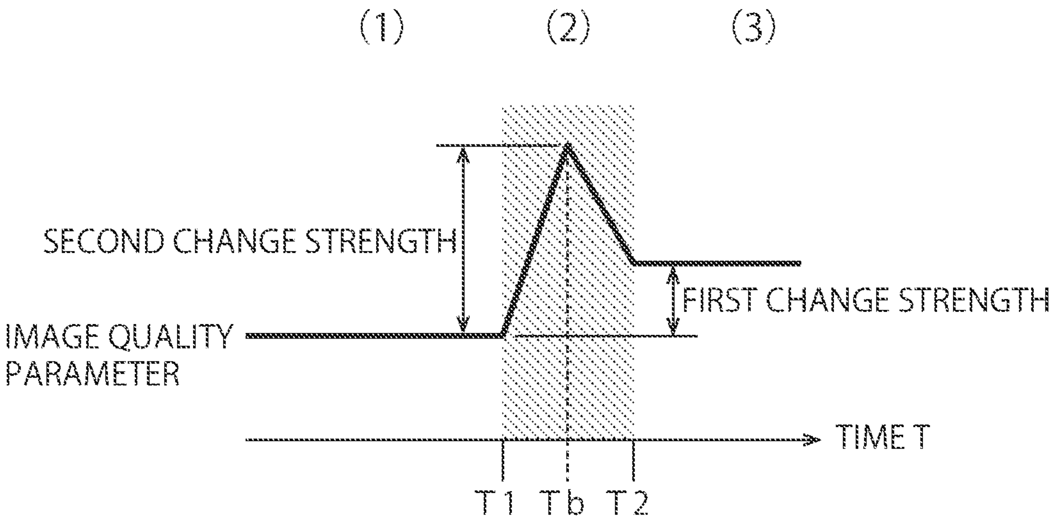
FIG. 10 is a diagram illustrating a further different exemplary chronological change of the image quality parameter of the medical image, displayed by the image quality adjustment screen display process shown in FIG. 5.

FIG. 10 is a diagram illustrating a further different exemplary chronological change of the image quality parameter of the medical image displayed by the medical image processing apparatus 100 according to the present embodiment. In the example shown in FIG. 10, the second medical image generating function 206*b* in the controller 206 generates the second medical image as the moving image by gradually changing the value of the image quality parameter of the reference medical image from time T1 to time Tb, in the direction equal to the modification direction of the first change strength until reaching the second change strength greater than the first change strength. Further, the second medical image generating function 206*b* in the controller 206 generates the second medical image as the moving image by gradually changing the value of the image quality parameter of the second medical image from time Tb to time T2, towards the value of the image quality parameter of the first medical image. Then, at time T2, the value of the image quality parameter of the second medical image generated by the second medical image generating function 206*b* in the controller 206 becomes the value equal to the image quality parameter of the first medical image.

The switch and display function 206*c* in the controller 206 displays the second medical image generated by the second medical image generating function 206*b* from time T1 to time T2 as the moving image and displays the first medical image generated by the first medical image generating function 206*a* after time T2. Thus, the medical image displayed on the image quality adjustment selection screen W10 as the thumbnail image becomes the moving image from time T1 to time T2 but becomes the still image after time T2. In other words, the chronological change of the image quality parameter of FIG. 10 means becoming the moving image from time T1 to time T2 and the still image after time T2.

Even if the image quality parameter is changed as shown in FIG. 10, the second medical image generating function 206*b* may change the value of the image quality parameter of the second medical image with the second change strength greater than the first change strength, allowing the user to easily recognize slight changes in the image quality. In addition, since the value of the image quality parameter of the second medical image gradually approaches toward the second change strength from time T1 to time Tb, and the value of the image quality parameter of the second medical image gradually approaches toward the value of the image quality parameter of the first medical image from time Tb to time T2, the user may easily understand more intuitively to what extent the change of the value of the image quality parameter affects the image quality.

Figure 11:
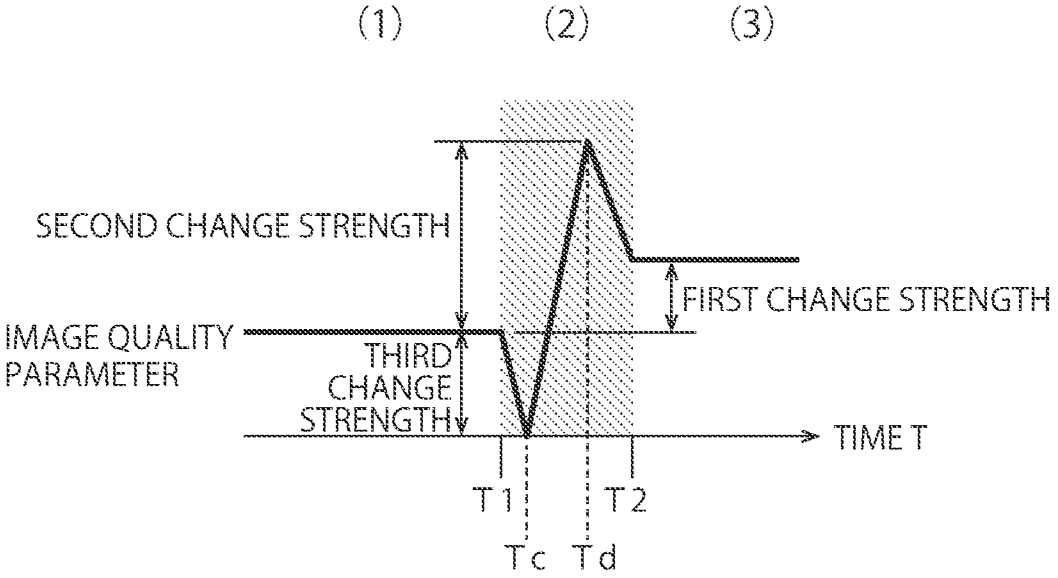
FIG. 11 is a diagram illustrating a further different exemplary chronological change of the image quality parameter of the medical image, displayed by the image quality adjustment screen display process shown in FIG. 5.

FIG. 11 is a diagram illustrating a further different exemplary chronological change of the image quality parameter of the medical image, displayed by the medical image processing apparatus 100 according to the present embodiment. In the example shown in FIG. 11, the second medical image generating function 206*b* in the controller 206 generates the second medical image as the moving image by gradually changing the value of the image quality parameter of the reference medical image in the direction opposite to the modification direction of the first change strength. Here, an amplitude of a third change strength (third change width) is arbitrary, where the third change strength refers to the change strength of the image quality parameter at this time.

Next, the second medical image generating function 206*b* in the controller 206 generates the second medical image as the moving image by gradually changing the value of the image quality parameter of the second medical image from time Tc to time Td, until reaching the second change strength greater than the first change strength in the direction equal to the modification direction of the first change strength with respect to the value of the image quality parameter of the reference medical image. Further, the second medical image generating function 206*b* in the controller 206 generates the second medical image as the moving image by gradually changing the value of the image quality parameter of the second medical image from time Td to time T2 towards the image quality parameter of the first medical image. Then, at time T2, the value of the image quality parameter of the second medical image generated by the second medical image generating function 206*b* in the controller 206 becomes a value equal to the value of the image quality parameter of the first medical image.

As may be known from such, a sum of the second change strength and the third change strength becomes the change strength for the moving image of the image quality parameter of the second medical image. Thus, the larger the third change strength is, the larger the change strength for the moving image of the image quality parameter of the second medical image becomes and the more a perceptibility of the user is improved.

The switch and display function 206*c* in the controller 206 displays the second medical image generated by the second medical image generating function 206*b* as the moving image from time T1 to time T2, and displays the first medical image generated by the first medical image generating function 206*a* as the still image after time T2. Thus, the medical image displayed on the image quality adjustment selection screen W10 as the thumbnail image is the moving image from time T1 to time T2 and the still image after time T2. In other words, the chronological change of the image quality parameter of FIG. 11 means becoming the moving image from time T1 to time T2 and the still image after time T2.

Even if the image quality parameter is changed as shown in FIG. 11, the second medical image generating function 206*b* may change the value of the image quality parameter of the second medical image with the second change strength greater than the first change strength, allowing the user to easily recognize slight changes of the image quality. Specifically, in the example of FIG. 11, since the value of the image quality parameter of the reference image from time T1 to time Tc is changed in a direction opposite to the modification direction of the first change strength and then gradually changed until reaching the second change strength with respect to the value of the image quality parameter of the reference medical image, the change strength of the value of the image quality parameter may be further enlarged. That is, in the example of FIG. 11, the image quality parameter to be changed may be greatly changed until reaching the sum of the second change strength and the third change strength. Thus, the user may easily understand more intuitively the effect on the image quality by changing the value of the image quality parameter.

Figure 12:
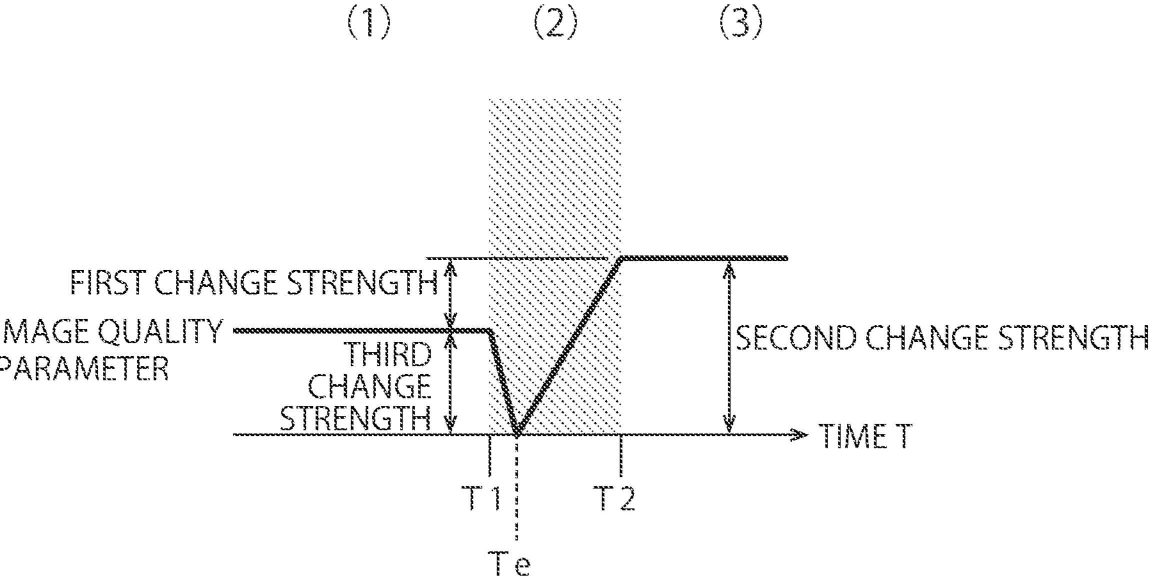
FIG. 12 is a diagram illustrating a further different exemplary chronological change of the image quality parameter of the medical image, displayed by the image quality adjustment screen display process shown in FIG. 5.

FIG. 12 is a diagram illustrating a further different exemplary chronological change of the image quality parameter of the medical image, displayed by the medical image processing apparatus 100 according to the present embodiment. In the example shown in FIG. 12, the second medical image generating function 206*b* in the controller 206 generates the second medical image as the moving image by gradually changing the value of the image quality parameter of the reference medical image in the direction opposite to the modification direction of the first change strength. Similarly to FIG. 11, the amplitude of the third change strength is arbitrary, where the third change strength refers to the change strength of the image quality parameter at this time.

Next, the second medical image generating function 206*b* in the controller 206 generates the second medical image as the moving image by gradually changing the value of the image quality parameter of the second medical image from time Te to time T2 towards the value of the image quality parameter of the first medical image. Then, at time T2, the value of the image quality parameter of the second medical image generated by the second medical image generating function 206*b* in the controller 206 becomes equal to the value of the image quality parameter of the first medical image. Thus, the change strength of the value of the image quality parameter from time T1 to time T2 is the second change strength, which is the sum of the first change strength and the third change strength. That is, the image quality parameter of the medical image may be changed with the second change strength greater than the first change strength. Thus, the larger the third change strength is, the larger the change strength for the moving image of the image quality parameter of the second medical image becomes and the more the perceptibility of the user is improved.

The switch and display function 206*c* in the controller 206 displays the second medical image generated by the second medical image generating function 206*b* as the moving image from time T1 to time T2 and displays the first medical image generated by the first medical image generating function 206*a* as the still image after time T2. Thus, the medical image displayed on the image quality adjustment selection screen W10 as the thumbnail image becomes the moving image from time T1 to time T2 and the still image after time T2. In other words, the chronological change of the image quality parameter of FIG. 12 means becoming the moving image from time T1 to time T2 and the still image after time T2.

Figure 13:
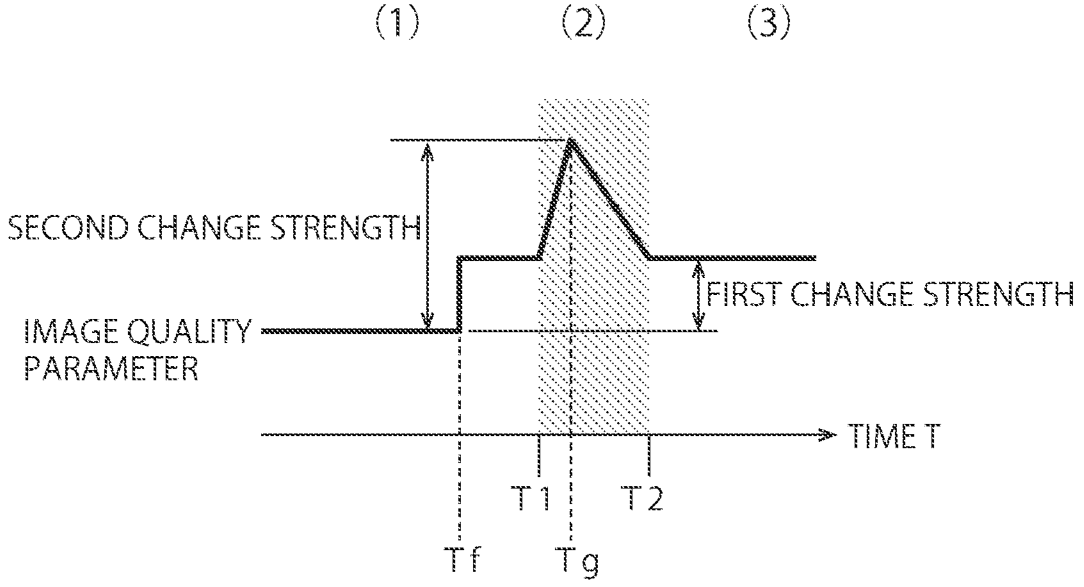
FIG. 13 is a diagram illustrating a further different exemplary chronological change of the image quality parameter of the medical image, displayed by the image quality adjustment screen display process shown in FIG. 5.

FIG. 13 is a diagram illustrating a further different exemplary chronological change of the image quality parameter of the medical image, displayed by the medical image processing apparatus 100 according to the present embodiment. In the example shown in FIG. 13, the switch and display function 206*c* in the controller 206 once displays the first medical image generated by the first medical image generating function 206*a*, then displays the second medical image generated by the second medical image generating function 206*b*, and displays the first medical image generated by the first medical image generating function 206*a* again.

Specifically, the switch and display function 206*c* in the controller 206 displays the reference medical image until time Tf, and displays the first medical image generated by the first medical image generating function 206*a* from time Tf to time T1. Then, the switch and display function 206*c* in the controller 206 displays the second medical image generated by the second medical image generating function 206*b* from time T1 to time T2.

In between time T1 to time T2, the second medical image generating function 206*b* in the controller 206 generates the second medical image as the moving image by gradually changing the value of the image quality parameter of the displayed medical image from time T1 to time Tg, from the value of the image quality parameter of the first medical image until reaching the second change strength greater than the first change strength in the direction equal to the modification direction of the first change strength. Further, the second medical image generating function 206*b* in the controller 206 generates the second medical image as the moving image by gradually changing the value of the image quality parameter of the second medical image from time Tg to time T2 towards the value of the image quality parameter of the first medical image. Then, at time T2, the value of the image quality parameter of the second medical image generated by the second medical image generating function 206*b* in the controller 206 becomes the value equal to the value of the image quality parameter of the first medical image.

As such, since the switch and display function 206*c* in the controller 206 switches the displayed medical image in an order of the first medical image, the second medical image, and the first medical image, the user may once confirm the screen of the medical image changed by the user and observe the second medical image of which the change of the image quality parameter is enhanced, and it becomes possible to understand with more detail the effect on the image quality by changing the value of the image quality parameter.

The changing pattern of the image quality parameter of the second medical image displayed between time T1 and time T2 is not limited to the example of FIG. 13. That is, the changing pattern of the image quality parameter of the second medical image during which the displayed medical image is switched in order of the first medical image, the second medical image, and the first medical image is arbitrary.

Figure 14:
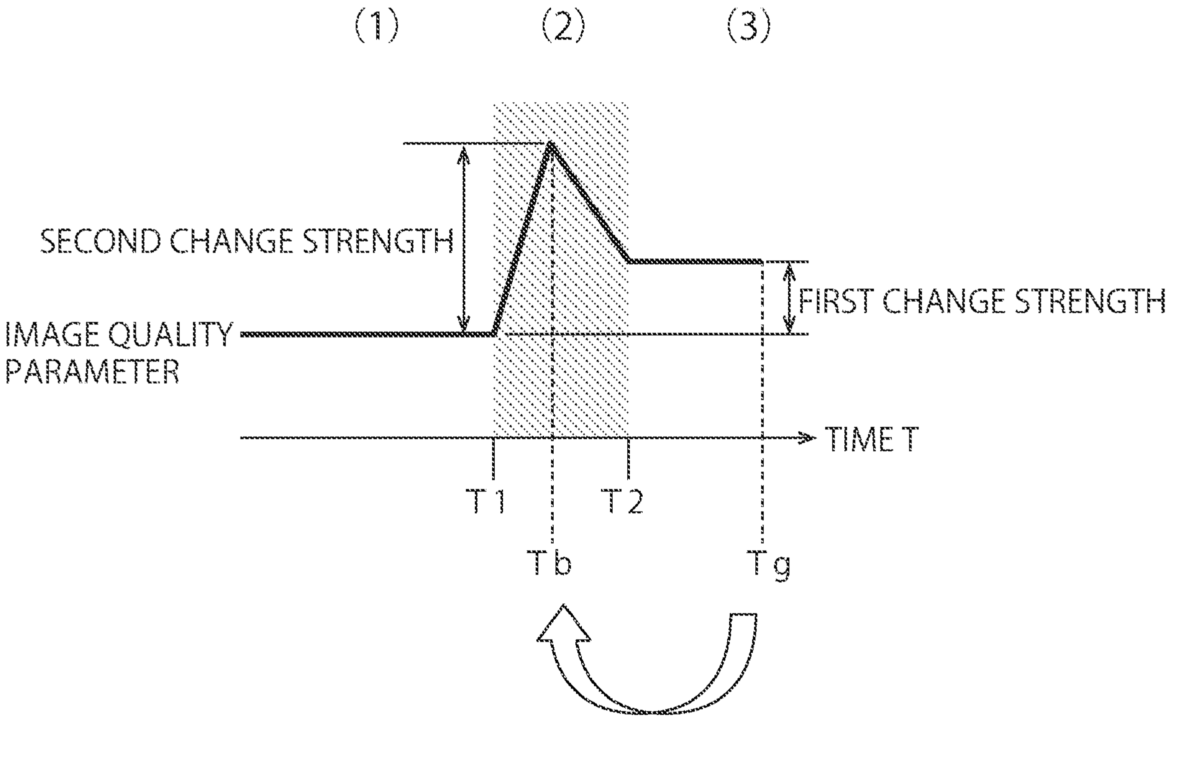
FIG. 14 is a diagram illustrating an example where the chronological change of the image quality parameter of the medical image, displayed by the image quality adjustment screen display process shown in FIG. 5, is repeated.

FIG. 14 is a diagram illustrating an example where the chronological change of the image quality parameter of FIG. 10 described above is further changed. The pattern itself of the chronological change of the image quality parameter of FIG. 14 is equal to the pattern of chronological change of the image quality parameter of FIG. 10. However, in the example of FIG. 14, the phase (2) and the phase (3) are repeated. That is, the thumbnail image displayed as the medical image on the image quality adjustment selection screen W10 is displayed as the moving image where the phase (2) and the phase (3) are repeated with a predetermined period.

Specifically, the switch and display function 206*c* in the controller 206, in the phase (2) and the phase (3), repeats a process of switching and displaying the first medical image generated by the first medical image generating function 206*a* and the second medical image generated by the second medical image generating function 206*b*. That is, the switch and display function 206*c* displays the second medical image generated by the second medical image generating function 206*b* as the thumbnail image of the image quality adjustment selection screen W10 from time T1, and displays the first medical image generated by the first medical image generating function 206*a* as the thumbnail image of the image quality adjustment selection screen W10 from time T2. Then, the switch and display function 206*c* returns to a state of time T1 at time Tg, displays the second medical image generated by the second medical image generating function 206*b* again, and repeats such display process thereafter.

As such, the user may verify the effect on the image quality several times by changing the value of the image quality parameter and make more confident judgements by repeating the process of switching and displaying the first and second medical images. Specifically, slight changes that may be overlooked with one switch and display may be properly recognized by repeatedly observing.

Although the phase (2) and (3) are repeated in the example of FIG. 14, the phase (1), (2), and (3) may be repeated. That is, it may become easier to understand the effect on the original medical image by the changing the value of the image quality parameter by repeating from the phase (1) which displays the reference medical image.

Likewise, the process of repeating and displaying the phase (2) and the phase (3), or the process of repeating and displaying the phase (1), the phase (2), and the phase (3) may be applied to the pattern of chronological change of other image quality parameters such as in FIGS. 6, 8, 9, 11, 12, and 13.

[Change of a Plurality of Image Quality Parameters]

Although only one image quality parameter is changed in the image quality adjustment screen display process described above, a plurality of image quality parameters may be changed in the image quality adjustment screen display process. For instance, in the image quality adjustment selection screen W10 of FIG. 4, the thumbnail image of the third image quality adjustment button 303 is configured with the first and second medical images where the value of the image quality parameter of edge enhancement is changed. Here, the image quality parameter of which the value is changed is the edge enhancement. On the other hand, the first and second medical images where the values of two image quality parameters, the edge enhancement and the noise reduction, are changed, are displayed as the thumbnail image of the fifth image quality adjustment button 305.

Figure 15:
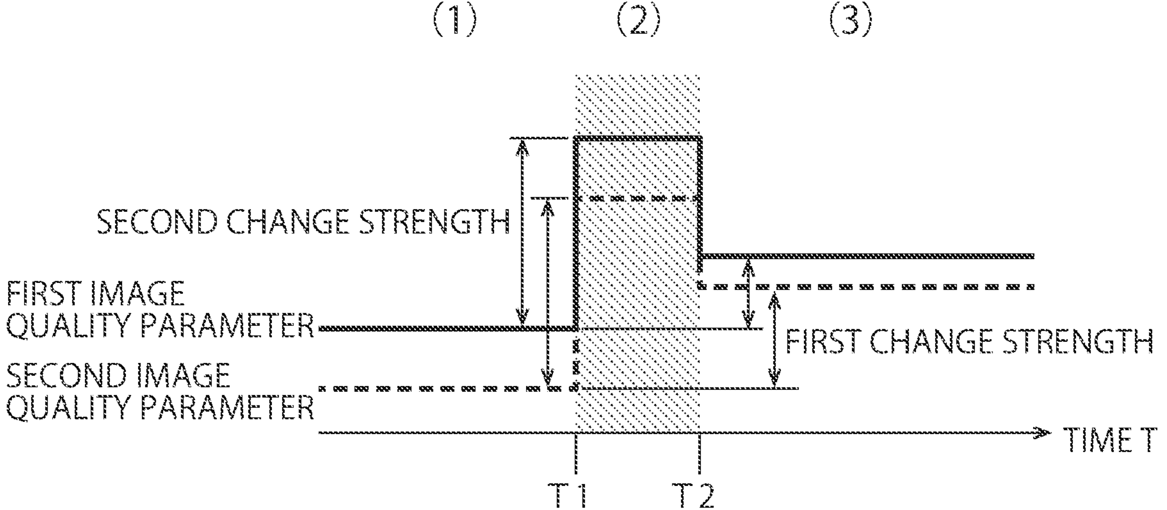
FIG. 15 is a diagram illustrating an exemplary chronological change of the image quality parameters where two image quality parameters are changed by the image quality adjustment screen display process shown in FIG. 5.

FIG. 15 is a diagram illustrating an exemplary chronological change of each image quality parameter where values of two image quality parameters, a first image quality parameter and a second image quality parameter, are changed, which corresponds to the pattern of chronological change of FIG. 6 described above. Here, for example, the first image quality parameter may be the parameter of the edge enhancement filter and the second image quality parameter the parameter of the noise reduction filter.

In the example shown in FIG. 15, the first and second image quality parameters change at a simultaneous timing. Thus, the change of the values of the first and second image quality parameters are simultaneously enhanced in the phase (2). More specifically, the second image generating function 206*b* in the controller 206 generates the second medical image by simultaneously changing values of the first and second image quality parameters at time T1. More specifically, the second medical image generating function 206*b* in the controller 206 generates the second medical image where the value of the first image quality parameter is changed with the second change strength greater than the first change strength and where the value of the second image quality parameter is changed with the second change strength greater than the first change strength. Thus, the second medical image, of which the change of the image quality parameter where values of two image quality parameters are simultaneously changed is enhanced, is generated.

Here, the first change strength of the value of the first image quality parameter may be equal to or different from the first change strength of the value of the second image quality parameter. Likewise, the second change strength of the value of the first image quality parameter may be equal to or different from the second change strength of the value of the second image quality parameter.

Also, the first medical image generating function 206*a* generates the first medical image where the value of the first image quality parameter is changed with the first change strength and the value of the second image quality parameter is changed with the first change strength. Then, the switch and display function 206*c* in the controller 206*c* switches the displayed medical image from the second medical image to the first medical image at time T2.

By simultaneously changing and enhancing the values of the first and second image quality parameters as such with the second change strength, the user may more precisely recognize the effect on the image quality by changing values of two image quality parameters.

Figure 16:
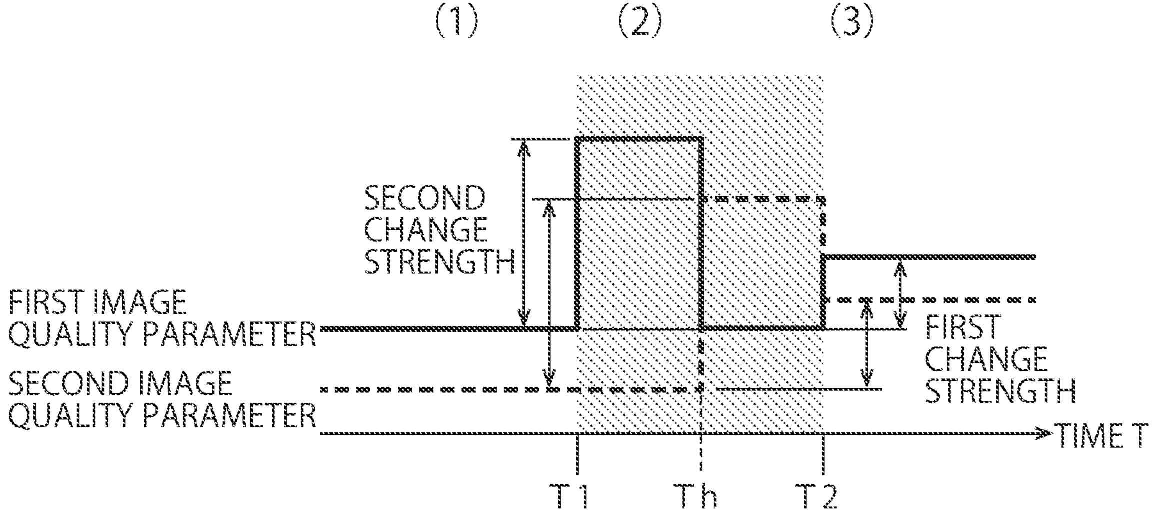
FIG. 16 is a diagram illustrating a different exemplary chronological change of the image quality parameters where two image quality parameters are changed by the image quality adjustment screen display process shown in FIG. 5.

On the other hand, the values of the first and second image quality parameters may be changed at different timings. FIG. 16 is a diagram illustrating an exemplary chronological change of each image quality parameter when the values of the first and second image quality parameters are changed at different timings. In the example of FIG. 16, between time T1 to time Th in the phase (2), the second medical image where the value of the first image quality parameter is changed and enhanced is displayed, and between time Th to time T2, the second medical image where the value of the second image quality parameter is changed and enhanced is displayed.

More specifically, the second medical image generating function 206*b* in the controller 206 generates the second medical image where the value of the first image quality parameter of the reference image is changed with the second change strength greater than the first change strength from time T1 to time Th. In the second medical image, the value of the second image quality parameter has not changed from the value of the second image quality parameter of the reference medical image. The switch and display function 206*c* selects and displays the second medical image as the medical image.

Next, the second medical image generating function 206*b* in the controller 206 generates the second medical image by changing the value of the second image quality parameter of the reference medical image with the second change strength greater than the first change strength from time Th to time T2. In the second medical mage, the value of the first image quality parameter has not changed from the value of the first image quality parameter of the reference medical image. The switch and display function 206*c* selects and displays the second medical image as the medical image.

Also, the first medical image generating function 206*a* generates the first medical image by changing the value of the first image quality parameter with the first change strength and changing the value of the second image quality parameter with the first change strength. Then, the switch and display function 206*c* in the controller 206 switches the displayed medical image from the second medical image to the first medical image.

By changing in order and enhancing the values of the first image quality parameter and the second image quality parameter with the second change strength, the user may separately observe the effects on the image quality by changing each value of the two image quality parameters. That is, by separately displaying the second medical image of which the value of the first image quality parameter is changed by the second medical image generating function 206*b* and the second medical image of which the value of the second image quality parameter is changed by the second medical image generating function 206*b*, the user may separately judge the effects of changing each image quality parameter. As a result, the user may more precisely recognize the effects on the image quality by changing values of two image quality parameters.

Figure 17:
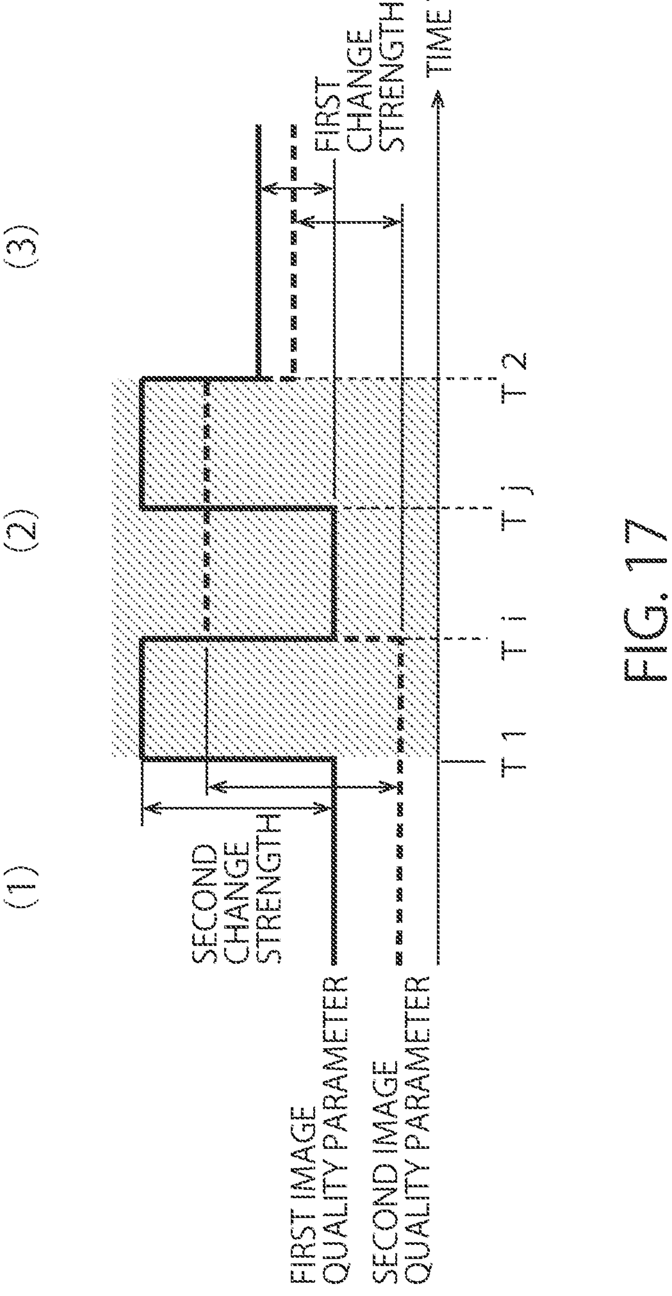
FIG. 17 is a diagram illustrating a further different exemplary chronological change of the image quality parameters where two image quality parameters are changed by the image quality adjustment screen display process shown in FIG. 5.

FIG. 17 is a diagram illustrating a different exemplary chronological change of each image quality parameter where the values of the first and second image quality parameters are changed at different timings. In the example of FIG. 17, the second medical image is generated by changing the values of the first and second image quality parameters at different timings and then simultaneously changing the values of the first and second image quality parameters in the phase (2).

More specifically, the second medical image generating function 206*b* in the controller 206 generates the second medical image by changing the value of the first image quality parameter of the reference medical image with the second change strength greater than the first change strength from time T1 to time Ti. In the second medical image, the value of the second image quality parameter has not changed from the value of the second image quality parameter of the reference medical image. The switch and display function 206*c* selects and displays the second medical image as the medical image.

Next, the second medical image generating function 206*b* in the controller 206 generates the second medical image by changing the value of the second image quality parameter of the reference medical image with the second change strength greater than the first change strength from time Ti to time Tj. In the second medical image, the value of the first image quality parameter has not changed from the value of the first image quality parameter of the reference medical image. The switch and display function 206*c* selects and displays the second medical image as the medical image.

Next, the second medical image generating function 206*b* in the controller 206 generates the second medical image by changing each of the values of the first and second image quality parameters of the reference medical image with the second change strength greater than the first change strength from time Tj to time T2. The switch and display function 206*c* selects and displays the second medical image as the medical image.

Also, the first medical image generating function 206*a* generates the first medical image by changing the values of the first and second image quality parameters with the first change strength. Then, the switch and display function 206*c* in the controller 206 switches the displayed medical image from the second medical image to the first medical image at time T2.

By changing in order and enhancing the values of the first and second image quality parameters with the second change strength, the user may separately observe the effects on the image quality by changing each value of the two image quality parameters. Also, since the values of the first and second image quality parameters are changed and enhanced together with the second change strength thereafter, the user may more appropriately understand the effects on the image quality by simultaneously changing the values of two image quality parameters.

Values of an arbitrary number of image quality parameters may be changed when the plurality of values of the image quality parameters are changed by the first medical image generating function 206*a* and the second medical image generating function 206*b*. In other words, it may be said that the image quality parameters of which the values are changed by the first medical image generating function 206*a* and the second medical image generating function 206*b* includes at least two image quality parameters such as the first image quality parameter and the second image quality parameter different from the first image quality parameter.

Figure 18:
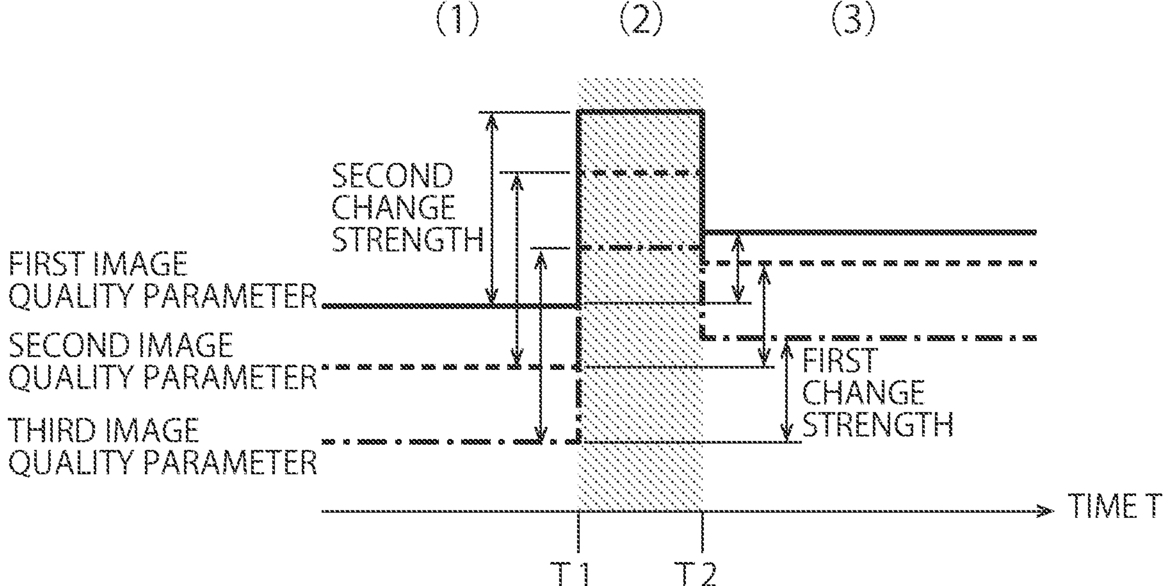
FIG. 18 is a diagram illustrating an exemplary chronological change of the image quality parameters where three image quality parameters are changed by the image quality adjustment screen display process shown in FIG. 5.

For instance, when there are three image quality parameters of which the values are changed by the first medical image generating function 206*a* and the second medical image generating function 206*b*, the pattern of chronological change of the image quality parameter as shown in FIG. 15 may be represented as in FIG. 18. Even in the example of FIG. 18, the first change strength of the values of the first, second, and third image quality parameters may each be equal or different. Similarly, the second change strength of the values of the first, second, and third image quality parameters may each by equal or different.

The pattern of chronological change of the second medical image generated by the second medical image generating function 206*b* by changing the values of the first and second image quality parameters is not limited to the patterns shown in FIG. 15 to FIG. 18 but may show various patterns of chronologically change. Specifically, the pattern of chronological change shown in FIG. 6 is applied to the plurality of image quality parameters in the examples of FIG. 15 to FIG. 18 described above, but the patterns of chronological change shown in FIG. 9 to FIG. 13 may be applied to the examples of FIG. 15 to FIG. 18.

Also, the switch and display function 206*c* may repeat the process of switching and displaying the first medical image and the second medical image as shown in FIG. 14 described above. That is, the change of image quality patterns shown in FIG. 15 to FIG. 18 may be repeatedly displayed.

As described above, in the medical image processing apparatus 100 according to the present embodiment, since the second medical image generating function 206*b* in the controller 206 generates the second medical image where the change of image quality is enhanced by changing the value of the image quality parameter of the reference medical image with the second change strength greater than the first change strength, the user may more precisely recognize the effect on the medical image by changing the value of the image quality parameter. Thus, the user may confirm the change of image quality when changing the value of the image quality parameter while observing slight changes on the image quality using the image quality adjustment selection screen W10.

Second Embodiment

In addition to the medical image processing apparatus 100 according to the first embodiment described above, the medical image processing apparatus 100 according to the second embodiment allows to select the value of the image quality parameter of the second medical image as the value of the image quality parameter of the first medical image at a user specified timing when the second medical image is displayed as the moving image. Parts that differ from that of the first embodiment will be described below.

Figure 19:
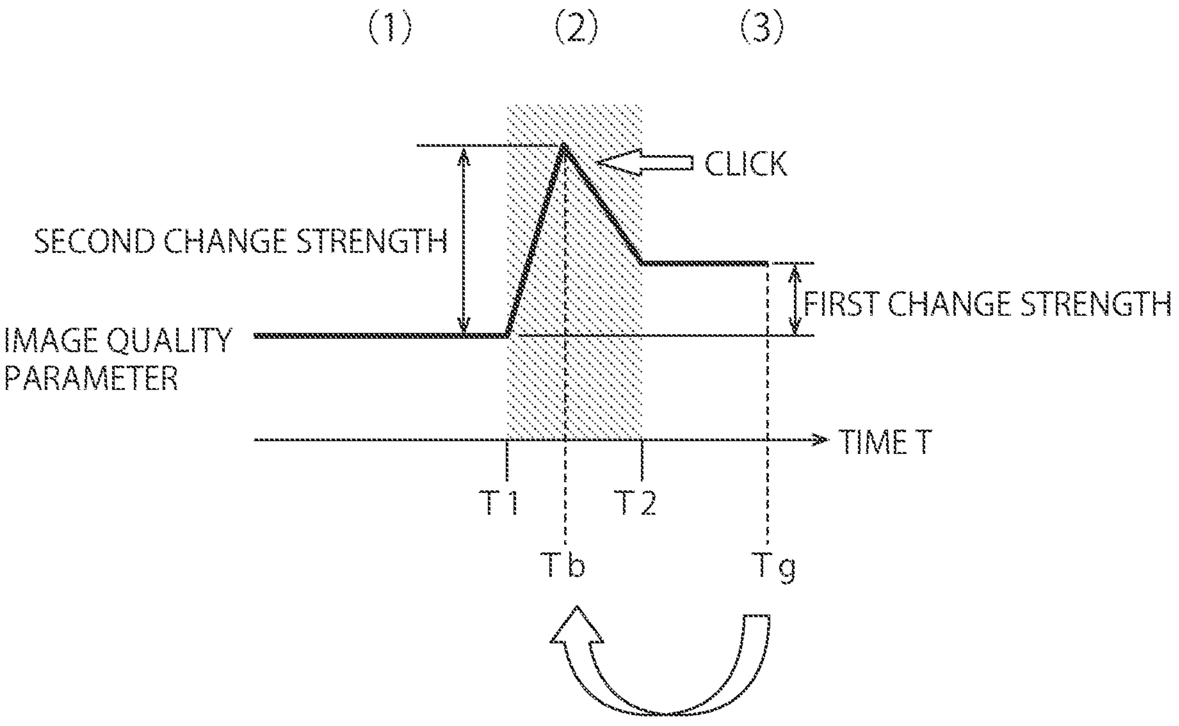
FIG. 19 is a diagram illustrating an exemplary timing when a user selects the image quality parameter during the chronological change of the image quality parameter of the medical image displayed in the image quality adjustment screen display process executed by the medical image processing apparatus according to a second embodiment.

FIG. 19 is a diagram illustrating an exemplary chronological change of the image quality parameter in the medical image displayed by the medical image processing apparatus 100 according to the present embodiment, which corresponds to FIG. 14 of the first embodiment described above. That is, the chronological change of the image quality parameter shown in FIG. 19 is repeated with the predetermined period.

For instance, with the image quality adjustment setting screen W10 of FIG. 4 displayed on the touch command screen 104, suppose that the first and second medical images that repeat the chronological change shown in FIG. 19 for the image quality parameter of edge enhancement are displayed as the thumbnail image of the third image quality adjustment button 303. The user may select the value of the image quality parameter at that time displayed as the second medical image as the value of the image quality parameter of the first medical image by touching the third image quality adjustment button 303 displayed on the touch command screen 104.

Since the second medical image, which is the moving image, is repeatedly displayed as the thumbnail image of the third image quality adjustment button 303, the user may carefully observe the second medical image and touch the thumbnail image of the third image quality adjustment button 303 at a timing at which the user believes to be close to a desirable degree of edge enhancement. Then, the value of the image quality parameter of the second medical image at this touching timing becomes the value of the image quality parameter of the first medical image and the next anchor. Thus, the thumbnail image of the first image quality adjustment button 301 which is the reference medical image in the image quality adjustment selection screen W10 is switched to the first medical image using this value of the image quality parameter.

The selecting function 206*d* in the controller 206 detects which thumbnail image the user has touched or at what timing the user has touched the thumbnail image. Thus, the selecting function 206*d* is equivalent to an image parameter selector in the present embodiment. That is, the medical image processing apparatus 100 according to the second embodiment additionally has the image quality parameter selector that selects the value of the image quality parameter of the second medical image at the user specified timing as the value of the image quality parameter of the first medical image when the switching display function 206*c* displays the medical image generated as the moving image by the second medical image generating function 206*b*.

The pattern of chronological change of the image quality parameter of the second medical image displayed by the medical image processing apparatus 100 according to the second embodiment is not limited to the pattern shown in FIG. 19, but may be arbitrary patterns. For instance, the second medical image generating function 206*b* may generate the second medical image as the moving image based on the pattern of chronological change of the image quality patterns as shown in FIG. 9, FIG. 11, FIG. 12, or FIG. 13, and when the switch and display function 206*c* repeatedly displays this, the user may, at the arbitrary timing, use the selecting function 206*d* to set the value of the image quality parameter of the first medical image as the value of the image quality parameter of the first medical image.

Also, the present embodiment may be applied even when the plurality of image quality parameters is chronologically changed. For instance, when the second medical image generating function 206*b* generates the second medical image as the moving image by chronologically changing two image quality parameters, the edge enhancement and noise reduction, the second medical image is displayed as the moving image on the thumbnail image of the fifth image quality adjustment button 305 of the image quality adjustment setting screen W10.

Then, while observing the thumbnail image of the fifth image quality adjustment button 305 displayed as the moving image, the user touches the thumbnail image of the fifth image quality adjustment button 305 at a timing when the thumbnail image of the fifth image quality adjustment button 305 is displayed with a value of the image quality parameter desirable to the user. By such, values of two image quality parameters of edge enhancement and noise reduction of the fifth image quality adjustment button 305 at the user touched timing are selected as the value of the image quality parameter of the first medical image and becomes the new anchor.

Further, although the parameter values of noise reduction, edge enhancement, and coherency are respectively determined by changing roles of the second to fourth image quality adjustment buttons 302-304 on the image quality adjustment setting screen W10 shown in FIG. 4, the function of determining the anchor may not be assigned. If the operability of the image quality adjustment setting screen W10 is designed as such, the user may touch the third image quality adjustment button 303 to determine the parameter value of edge enhancement after touching the second image quality adjustment button 302 to determine the parameter value of noise reduction. On the other hand, the user may touch the fifth image quality adjustment button 305 to determine the parameter values of noise reduction and edge enhancement with one touch operation.

Also, in the medical image processing apparatus 100 according to the second embodiment, the switch and display function 206*c* does not have to repeatedly display the second medical image. That is, as described using FIG. 10 etc., in the first embodiment described above, the switch and display function 206*c* may display the medical image once in order of the reference medical image, the second medical image, and the first medical image. However, in this case, there is only one chance for the user to select the value of the image quality parameter.

As described above, according to the medical image processing apparatus 100 according to the present embodiment, by the user touching the second medical image displayed as the moving image, the value of the image quality parameter of the second medical image at the touched timing may be selected as the value of the image quality parameter of the first medical image. Thus, the user may determine a value of the image quality parameter desirable to the user while confirming the moving image of the second medical image. Especially, since the second medical image is the medical image where the image quality parameter which the user tries to adjust is enhanced, there is a possibility of reaching the medical image of the value of the image quality parameter optimal to the user with a fewer number of operation or with shorter time.

[Modifications Common to Each Embodiment]

In the first and second embodiments described above, the configuration and operation of the medical image processing apparatus 100 was described with a premise of using the image quality adjustment setting screen W10 of FIG. 4 where a plurality of medical images are displayed, but the image quality adjustment setting screen W10 does not have to be used when executing the image quality adjustment screen display process described above. That is, the screen layout to display the reference medical image, the second medical image, and the first medical image in order is arbitrary. For instance, a single medical image may be displayed on the touch command screen 104, and the switch and display function 206*c* may switch the display in order of the reference medical image, the second medical image, and the first medical image. In this case, the user may observe the effect the image quality by changing the value of the image quality parameter with an image larger than the thumbnail image.

Also, in the description of the embodiments described above, although the pattern of chronological change of the second medical image generated by the second medical image generating function 206*b* was described as the example where the user increases the value of the image quality parameter, the description of the embodiment described above may be applied when the user decreases the value of the image quality parameter as it is. That is, a relationship between the pattern of chronological change when increasing the value of the image quality parameter as shown in FIG. 6 and the pattern of chronological change when decreasing the value of the image quality parameter as shown in FIG. 8 may be applied to other patterns of chronological change of the image quality parameter as it is.

Further, in the embodiments described above, although the pattern of chronological change of the image quality parameter was described with the example where the changing pattern is linear, the changing pattern does not have to be necessarily linear. That is, the changing pattern of the image quality parameter may be curved, such as a parabola or a quadratic function.

Also, in the embodiments described above, although the second medical image was generated as the moving image to allow the user recognize the chronological change of the image quality parameter, the displaying aspect does not necessarily have to be the moving image. For instance, the medical image processing apparatus 100 may have the second medical image generating function 206*b* generate a plurality of still images as the second medical image based on the chronological change of the image quality parameter and then have the switch and display function 206*c* line up and display the plurality of still images, allowing the user to recognize the chronological change of the image quality parameter. For instance, as shown in FIG. 7A through FIG. 7C, if the image quality parameter is the value of edge enhancement filter, the user may recognize the effect on the image quality by changing the edge enhancement by lining up and displaying FIG. 7A, FIG. 7B, and FIG. 7C on a single screen.

Note that the word "processor" used in above descriptions means circuits such as, for example, a Central Processing Unit (CPU), a Graphics Processing Unit (GPU), an Application Specific Integrated Circuit (ASIC), a programmable logic device (for example, a Simple Programmable Logic Apparatus (SPLD), a Complex Programmable Logic Apparatus (CPLD), and a Field Programmable Gate Array (FPGA)). The processor executes functions by reading and executing programs stored in the memory. Note that programs may be configured to be directly integrated in the processor instead of being storing in the memory. In this case, the processor realizes functions by reading and executing programs stored in the circuit. Note that the processor is not limited to the case arranged as a single processor circuit, but may be configured as a single processor by combining a plurality of independent circuits to realize functions. Furthermore, a plurality of component elements in FIG. 3 may be integrated into one processor to realize the functions.

While certain embodiments have been described, these embodiments have been presented by way of example only and are not intended to limit the scope of the inventions. The embodiments may be in a variety of other forms. Furthermore, various omissions, substitutions and changes may be made without departing from the spirit of the inventions. The embodiments and their modifications are included in the scope and the subject matter of the invention, and at the same time included in the scope of the claimed inventions and their equivalents.

The invention claimed is:

1. A medical image processing apparatus, comprising:

processing circuitry configured to generate a first medical image based on a reference medical image, by changing a value of an image quality parameter of the reference medical image with a first change strength, wherein the first change strength is predetermined for the image quality parameter and the image quality parameter has been selected by a user in order to change the value of the image quality parameter with the first change strength;

generate a second medical image based on the reference medical image, which is a same image from which the first medical image was generated, by changing the value of the image quality parameter of the reference medical image with a second change strength, wherein the second change strength is greater than the first change strength; and switch and display the first medical image and the second medical image on a screen, wherein the processing circuitry is further configured to first automatically display the second medical image on the screen, after the image quality parameter has been selected by the user, and then automatically later display the first medical image on the screen.

2. The medical image processing apparatus of claim 1, wherein the processing circuitry is further configured to:

generate the second medical image by changing the value of the image quality parameter of the reference medical image with the second change strength greater than the first change strength in a direction equal to a modification direction of the first change strength; and display the second medical image for a predetermined amount of time on the screen and then display the first medical image on the screen.

3. The medical image processing apparatus of claim 1, wherein the processing circuitry is further configured to generate the second medical image as a moving image by changing the value of the image quality parameter of the reference medical image with the second change strength greater than the first change strength in a direction equal to a modification direction of the first change strength, and gradually changing the value of the image quality parameter towards the value of the image quality parameter of the first medical image.

4. The medical image processing apparatus of claim 3, wherein the processing circuitry is further configured to select, as a value of the image quality parameter of the first medical image, a value of the image quality parameter of the second medical image at a user specified timing while the second medical image generated as the moving image is being displayed on the screen.

5. The medical image processing apparatus of claim 1, wherein the processing circuitry is further configured to generate the second medical image as a moving image by gradually changing the value of the image quality parameter of the reference medical image until reaching the second change strength greater than the first change strength in a direction equal to a modification direction of the first change strength, and gradually changing the value of the image quality parameter towards the value of the image quality parameter of the first medical image.

6. The medical image processing apparatus of claim 1, wherein the processing circuitry is further configured to generate the second medical image as a moving image by gradually changing the value of the image quality parameter of the reference medical image in a direction opposite to a modification direction of the first change strength, gradually changing the value of the image quality parameter until reaching the second change strength greater than the first change strength in the direction equal to a modification direction of the first change strength with respect to the value of the image quality parameter of the reference medical image, and gradually changing the value of the image quality parameter towards the value of the image quality parameter of the first medical image.

7. The medical image processing apparatus of claim 1, wherein the processing circuitry is further configured to generate the second medical image as a moving image by gradually changing the value of the image quality parameter of the reference medical image in a direction opposite to a modification direction of the first change strength, and gradually changing the value of the image quality parameter towards the value of the image quality parameter of the first medical image.

8. The medical image processing apparatus of claim 1, wherein the processing circuitry is further configured to once display the first medical image on the screen, then display the second medical image on the screen, and further display the first medical image on the screen.

9. The medical image processing apparatus of claim 1, wherein the processing circuitry is further configured to repeat a process to switch and display the first medial image and the second medical image on the screen.

10. The medical image processing apparatus of claim 1, wherein the image quality parameter of which the values are changed by the processing circuitry includes at least a first image quality parameter and a second image quality parameter different from the first image quality parameter.

11. The medical image processing apparatus of claim 10, wherein the processing circuitry is further configured to generate the second medical image by simultaneously changing values of the first image quality parameter and the second image quality parameter.

12. The medical image processing apparatus of claim 10, wherein the processing circuitry is further configured to generate the second medical image by changing values of the first image quality parameter and the second image quality parameter at different timings.

13. The medical image processing apparatus of claim 10, wherein the processing circuitry is further configured to separately display the second medical image generated by changing a value of the first image quality parameter and the second medical image generated by changing a value of the second image quality parameter.

14. The medical image processing apparatus of claim 10, wherein the processing circuitry is further configured to change values of the first image quality parameter and the second image quality parameter at different timings, and then change the values of the first image quality parameter and the second image quality parameter simultaneously.

15. The medical image processing apparatus of claim 1, wherein the first medical image and the second medical image are thumbnail images for which a size of the reference medical image is reduced.

16. The medical image processing apparatus of claim 15, wherein the thumbnail images are medical images for which the value of the image quality parameter of the reference medical image is changed.

17. The medical image processing apparatus of claim 16, further comprising a display that displays the reference medical image and the thumbnail images on the screen, wherein different image quality parameters are changed in each of the thumbnail images.

18. The medical image processing apparatus of claim 17, wherein the value of the image quality parameter of the first medical image in a selected thumbnail image among the thumbnail images displayed on the screen of the display becomes a new value of the image quality parameter of the reference medical image.

19. The medical image processing apparatus of claim 1, wherein the processing circuitry is further configured to (1) automatically display, for a predetermined amount of time, the second medical image generated with the second change strength greater than the first change strength, without displaying the first medical image, and then (2) automatically display the first medical image generated with the first change strength less than the second change strength, without displaying the second medical image.

20. A control method of a medical image processing apparatus, the method comprising:

generating a first medical image based on a reference medical image, by changing a value of an image quality parameter of the reference medical image with a first change strength, wherein the first change strength is predetermined for the image quality parameter and the image quality parameter has been selected by a user in order to change the value of the image quality parameter with the first change strength;

generating a second medical image based on the reference medical image, which is a same image from which the first medical image was generated, by changing the value of the image quality parameter of the reference medical image with a second change strength, wherein the second change strength is greater than the first change strength; and switching and displaying the first medical image and the second medical image, wherein the second medical image is automatically displayed, after the image quality parameter has been selected by the user, and then later the first medical image is automatically displayed on the screen.

* * * * *